(12) United States Patent  (10) Patent No.: US 9,370,835 B2
Kundracik et al.  (45) Date of Patent: Jun. 21, 2016

(54) PORTABLE COMPACT THREADING MACHINE

(75) Inventors: Richard Kundracik, Elyria, OH (US); Glen R. Chartier, Avon Lake, OH (US); Qi Zhou, Shanghai (CN)

(73) Assignee: Emerson Electric Co., St. Louis, MO (US)

( * ) Notice: Subject to any disclaimer, the term of this patent is extended or adjusted under 35 U.S.C. 154(b) by 904 days.

(21) Appl. No.: 13/602,355

(22) Filed: Sep. 4, 2012

(65) Prior Publication Data

US 2013/0055862 A1 Mar. 7, 2013

Related U.S. Application Data

(60) Provisional application No. 61/531,344, filed on Sep. 6, 2011.

(51) Int. Cl.
*B23G 1/24* (2006.01)
*B23G 1/52* (2006.01)

(52) U.S. Cl.
CPC .. *B23G 1/24* (2013.01); *B23G 1/52* (2013.01); *Y10T 82/22* (2015.01)

(58) Field of Classification Search
CPC .............. B23G 1/22; B23G 1/24; B23G 1/52; B28D 7/04
See application file for complete search history.

(56) References Cited

U.S. PATENT DOCUMENTS

| | | | | |
|---|---|---|---|---|
| 1,943,643 A * | 1/1934 | Vosper | ........................ | 29/33 D |
| 1,947,874 A * | 2/1934 | Pealer | ............................ | 470/58 |
| 2,887,886 A * | 5/1959 | Chasar et al. | ...................... | 74/16 |
| 3,187,738 A * | 6/1965 | Christopher | ............... | 125/13.01 |
| 3,332,095 A * | 7/1967 | Ivester | ............................. | 408/28 |
| 3,605,530 A * | 9/1971 | Doty | ............................. | 82/113 |
| 3,631,552 A * | 1/1972 | Ivester | ............................. | 82/113 |
| 4,412,401 A | 11/1983 | Fundell | | |
| 4,426,178 A * | 1/1984 | Wuchner | ........................ | 408/28 |
| 4,787,531 A * | 11/1988 | Gress | ............................. | 220/324 |
| 5,087,013 A * | 2/1992 | Gress et al. | .................... | 248/676 |
| 5,148,587 A | 9/1992 | Phelps et al. | | |
| 5,826,469 A * | 10/1998 | Haradem | ........................ | 82/1.11 |
| 6,471,220 B1 * | 10/2002 | Babb | ............................... | 280/30 |
| 6,938,313 B2 | 9/2005 | Viola et al. | | |
| 8,096,519 B2 * | 1/2012 | Tam et al. | ...................... | 248/434 |
| 2013/0055862 A1 * | 3/2013 | Kundracik et al. | ............. | 82/113 |

FOREIGN PATENT DOCUMENTS

CN 2623395 7/2004

OTHER PUBLICATIONS

Invitation to Pay Additional Fees and, Where Applicable, Protest Fee (9 pages) (International Search Report) for PCT2012053653 , Nov. 29, 2012.
The International Bureau of WIPO, International Search Report and Written Opinion of the International Searching Authority, Feb. 6, 2013 (25 pages) for application PCT/US2012/053653.

* cited by examiner

*Primary Examiner* — Will Fridie, Jr.
(74) *Attorney, Agent, or Firm* — Mark E. Bandy; Rankin, Hill & Clark LLP

(57) ABSTRACT

A powered threading machine is described. The threading machine is compact and portable. The threading machine includes a tube frame having a rearward wheel assembly and an extendable handle at the front of the machine. A particular sump configuration is used to prevent loss of cutting oil during operation and transport of the machine.

56 Claims, 36 Drawing Sheets

_US 9,370,835 B2_

PORTABLE COMPACT THREADING MACHINE

CROSS REFERENCES TO RELATED APPLICATIONS

This application claims priority upon U.S. Ser. No. 61/531,344 filed Sep. 6, 2011.

FIELD

The present subject matter relates to portable powered devices for performing a variety of operations upon workpieces and particularly, devices for cutting, reaming, and threading pipe ends. The subject matter also relates to portable powered devices for cutting, removing, and/or forming workpiece materials.

BACKGROUND

Threads are used on a wide array of mechanical components, piping, and conduit for engaging components together and/or to provide a sealing connection between components. Numerous thread sizes and thread configurations are known, such as tapered threads and non-tapered or "straight" threads. Within each class, a variety of different thread forms have been developed and used depending upon the application, type of workpiece, customs of the locale, and preferences of the user.

Devices for forming threads on pipe ends are well known in the art. Such devices use one or more dies that form a helical thread extending from one region of the pipe to another region. The die is orbited about the axis of the pipe and/or the pipe is rotated while the die is engaged with a select region of the pipe to form the thread.

When assembling piping systems or when forming custom piping layouts, sections of pipe are typically cut and threaded at a construction or assembly site. As a result, pipe threading devices have been developed which can be transported to, and used at, the job site to prepare threaded pipe ends. However, such devices typically include a stand, bench or other support structure that must also be transported and set up at the job site. Transporting these various assemblies and/or engaging the components together takes up additional space and imposes further requirements in time and effort by a user.

In addition, most known powered threading devices are designed for use at a single location. Thus, these devices are optimized for stationary use and not designed to be easily moved from one location to another. Thus, although these devices can be moved and frequently are moved from one location to another, the large size and relatively heavy weight of most professional grade powered threading devices makes moving such devices quite difficult. Furthermore, when moving a threading machine, care must be taken to secure any tooling attachments in place. Otherwise, movement, vibration, or jarring may result in damage to the tooling attachments or their settings/alignment. In addition, many threading machines include a reservoir of cutting oil. Thus, when moving such threading machines, care must be taken to prevent loss or spillage of the cutting oil, or the oil must be transported in a separate container.

In most currently known threading machines, the base or housing of the unit is a major contributor to the overall cost of the machine. Typically the base encloses all of the machine components, provides structural support, and holds the thread cutting oil. The base is generally cast from aluminum or other materials and machined to the appropriate dimensions as needed.

Although such cast components are desirable from a structural or cosmetic perspective, they typically significantly increase the cost of the resulting threading machine. Not all users or applications require such structure and its associated higher cost. Instead, for many applications a lower cost alternative threading machine would be desirable.

Although most currently available threading devices are satisfactory, it would be desirable to provide an improved portable device. Specifically, it would be beneficial to provide a threading device which was portable such that it could be conveniently transported to a job site and used with minimal set-up time and effort. Furthermore, it would be desirable to provide a threading device that addressed all of the previously noted concerns associated with currently known threading machines.

SUMMARY

The difficulties and drawbacks associated with previously known devices are addressed in the present subject matter for a portable compact threading machine.

In one aspect, the present subject matter provides a compact portable threading machine comprising a frame defining a front portion and a rear portion. The machine also comprises a powered assembly for rotating a workpiece. The powered assembly includes (i) an electric motor, (ii) holding provisions to hold a workpiece, and (iii) a drive assembly for transferring rotary power from the motor to the holding provisions. The powered assembly is supported by the frame. The machine also comprises one or more wheels rotatably engaged proximate the rear portion of the frame. The machine additionally comprises a handle assembly secured to the front portion of the frame. And, the machine further comprises an oil sump for retaining cutting oil and including a transport sump compartment. The machine is positionable between an operational position and an inclined storage position.

In another aspect of the present subject matter, a compact portable threading machine is provided which is positionable between an operational position and an inclined transport position. The machine comprises a frame defining a front portion and a rear portion. The machine also comprises a powered assembly for rotating a workpiece. The powered assembly includes (i) an electric motor, (ii) holding provisions to hold a workpiece, and (iii) a drive assembly for transferring rotary power from the motor to the holding provisions. The machine also comprises an oil sump for retaining cutting oil and including at least one sump compartment. And, the machine comprises at least one wheel rotatably engaged to the frame. The at least one wheel is engaged to the frame such that when the machine is in an operational position, the at least one wheel is free from contact with the floor.

In still another aspect, the present subject matter provides a compact portable threading machine positionable between an operational position and an inclined transport position. The machine comprises a frame defining a front portion and a rear portion. The machine also comprises a powered assembly for rotating a workpiece. The powered assembly includes (i) an electric motor, (ii) holding provisions to hold a workpiece, and (iii) a drive assembly for transferring rotary power from the motor to the holding provisions. The machine also comprises an oil sump assembly for retaining cutting oil and including a main sump compartment which retains at least a portion of the cutting oil when the machine is in the operational position, and at least one transport sump compartment which retains substantially all of the cutting oil when the machine is in the transport position.

In yet another aspect, the present subject matter provides a compact portable threading machine comprising an extendable frame assembly including a first frame section and a pivotally attached second frame section. The first frame section includes a pair of wheels and the second frame section including a pair of handles. The machine also comprises a powered assembly for rotating a workpiece. The powered assembly includes (i) an electric motor, (ii) holding provisions for holding a workpiece, and (iii) a drive assembly for transferring rotary power from the motor to the holding provisions. The powered assembly is supported by the extendable frame assembly. The machine additionally comprises an oil sump for retaining cutting oil and including a sump compartment. The machine is positionable between an operational position and an inclined transport position.

As will be realized, the present subject matter is capable of other and different embodiments and its several details are capable of modifications in various respects, all without departing from the subject matter. Accordingly, the drawings and description are to be regarded as illustrative and not restrictive.

DETAILED DESCRIPTION OF THE EMBODIMENTS

Figure 1:
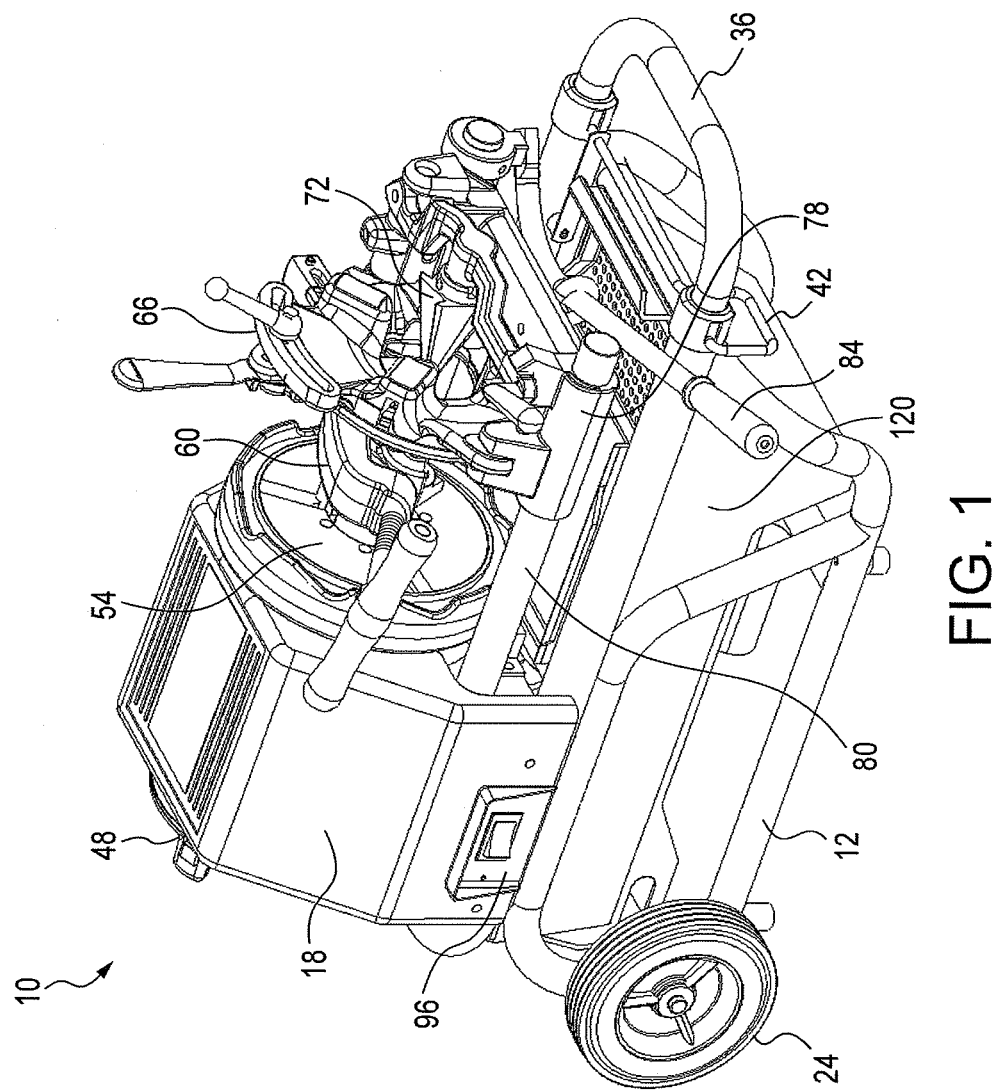
FIG. 1 is a front perspective view of a preferred embodiment threading machine in accordance with the present subject matter.

The present subject matter provides various devices, systems, and methods for performing various operations. For purposes of understanding the subject matter, the subject matter will be described in terms of thread forming devices.

However, it will be understood that in no way is the subject matter limited to these particular embodiments.

As previously noted, in many currently known threading machine assemblies, the base or housing of the unit is a major contributor to the overall cost of the machine. Typically the base encloses all of the machine components, provides structural support, and holds the thread cutting oil. The base is generally cast from aluminum or other materials and machined to the appropriate dimensions as needed. However, in a preferred embodiment according to the present subject matter, a cast body is used only for certain critical, highly stressed, or structural members of the machine. The remaining structure for enclosing the threading machine components and holding the thread cutting oil is formed from lower cost materials, such as for example, steel tubing and sheet metal and/or plastic covers. As a result, the total cost of the resulting assembly is reduced. Moreover, the weight of the resulting assembly is typically also reduced.

A steel tubing frame is typically used in the preferred embodiment threading machines. The steel tube frame is configured to significantly improve and preferably optimize the unit for portability and use on the floor or ground. Although in most embodiments, a tube frame, and in particular one formed from steel is preferred, it will be appreciated that the present subject matter is not limited to such. For example, the frame could be formed from a variety of weldments or even a plastic molded frame. Rubber feet or feet formed from other comparable materials, are positioned on the bottom of the frame to prevent sliding during use. In certain versions of the subject matter, it may be preferred to include adjustment provisions in the frame such that the height of the frame can be adjusted as desired by a user. As will be appreciated, such adjustment provisions include means for locking or otherwise securing the frame to the selected height. All of these aspects are described in greater detail herein.

In another version of the present subject matter, an alternative embodiment of the steel tube frame is provided. The wheels and/or handle are removed to reduce the cost and complexity of the design. The frame is altered by adding an extended and broadened resting point for storage. That is, a wider storage footprint is provided so that the unit is more stable during storage. This change requires that the unit is lifted during transport, but the other benefits of other embodiments described herein (i.e. storage without spilling oil, oil draining through the sump plug, cost benefits) still apply.

Certain preferred embodiment threading machines also include a particular wheel configuration. Wheels are provided at the rear of the frame assembly to allow the unit to be rolled into position. During use, the wheels of the assembly do not contact the floor. However, as the machine is lifted at the front of the frame assembly, the wheels are contacted with the floor or ground and allow the unit to roll freely for transport.

Another aspect of the preferred embodiment threading machines relates to a handle assembly which is preferably provided along a front region of the machine, and specifically on the frame assembly. In certain versions, the front handle of the preferred embodiment threading machine extends from the tube frame and latches into position at a height adapted for moving the assembly on the wheels.

In addition, the preferred embodiment threading machines include a sump tray or sump assembly having a particular configuration. As will be appreciated, the sump holds working liquids such as cutting oil used during operation of the threading machine. Preferably, the sump tray includes a main sump region and one or more transport sump region(s) in fluid communication with the main sump region. Baffles may also be used to slow or alter the flow of cutting oil between the main and transport sump regions. This may be done to limit splashing during transitions between the operation, transport and storage positions or during transport in a vehicle from one remote jobsite to another. As the threading machine is lifted to a transport position, the sump tray prevents the cutting oil from spilling. In an inclined position such as during transport, the oil flows into the transport sump region from the main sump region. The transport sump region is located generally underneath the machine and typically under a cast body as described in greater detail herein. Because this region within the threading machine assembly is typically occupied by a cast base, this feature is made possible by the unique configuration of the tubing frame. Thus, the tubing frame configuration is optimized for portability and use of the threading machine on the floor.

In another version of the subject matter, a threading machine as generally described herein is provided with an alternate configuration for the sump. The sump is simplified by locating the motor to one side of the transport sump. That is, the motor is adjacent to a single oil containing portion of the transport sump rather than between two separate oil containing portions of the transport sump connected by the main sump. A simple cover can be installed on the sides of the assembly opposite the transport sump. Because the cover does not contain fluid, it can be equipped with a number of vents to enable air circulation and/or dissipate the heat produced by the motor during threading operations. Also, tabs for mounting the sump are provided for easier assembly. The tabs wrap or extend over the tube frame and are simply secured with machine screws or other fasteners. Additionally, a guard is included to prevent cutting oil from dripping from a die head to the floor. Oil that drips on the guard is funneled back or otherwise directed into the sump by an inclined surface of the guard. A drain plug may be provided for cleaning the sump and one or more baffle(s) can be used to prevent or reduce the tendency of the oil from splashing.

In order to orient the threading machine in an inclined transport or storage position, additional features are provided which prevent damage to a slidable carriage and various components such as a cutter, a reamer, and a die head which are typically included in a threading machine. As the machine is lifted by the handle, and particularly by an extended handle, the slidable carriage will move toward the front chuck and/or cast body of the machine. Because of this, a rubber stop or bumper is provided to prevent impact of the carriage with the front chuck and/or cast body of the unit. In certain embodiments, the rubber stop or bumper is positioned on the threading machine to prevent contact between the slidable or trackable carriage and any other component rearward of the slidable carriage. In addition, a latch or clamping mechanism may be provided to fix a lever arm in place. Thus, a user can restrict the motion of the carriage and/or lever arm by engaging or securing the mechanism before transport.

In certain versions of the present subject matter, the noted bumper to prevent impact between the carriage and base and/or the clamping mechanism to prevent movement of the carriage during transport can be configured as follows. A bumper can be integrated into a hammer wheel guard located on the front rail of the threading machine. A clamping clip can be secured at the end of the rail to restrain the lever during transport and storage. The clip is typically formed from spring steel or a similar flexible material. The lever is lifted upward between one or more indentations on the tabs of the clip thereby causing the tabs to separate. Once the lever is lifted beyond the indentations, the tabs spring to their original position and lock the lever in place.

Another benefit of the steel tubing frame and oil sump design is the ability to store the unit in an upright position. After the user is finished using the machine, the handle and preferably an extendable handle, is used to lift the unit to a storage position. A stop or other member is provided on the back or rear of the tubing frame to hold the unit upright. As a result, the footprint of the machine is reduced for storage as compared to the footprint occupied during normal operation. Also, the oil flows into the transport sump compartment(s) thereby preventing spilling or loss of the fluid. Also in the storage position, the oil may be drained through a capped hole at the rear end of the transport sump. That is, when the machine is placed in this storage position, the capped hole is located along the bottom of the transport sump. By configuring the drain in this position, it is possible to funnel all of the oil to one location and completely drain the oil when the machine is in its storage position. In a typical threading machine sump, the plug is located at the side of an oil reservoir and it is difficult to completely drain the oil.

Another benefit of the preferred embodiment threading machines relates to the use of steel tubing in the frame. That is, the steel tubing frame also provides design flexibility. Because the motor enclosure is not constrained by a conventional cast aluminum housing, it is now possible to mount a number of different motors to the same assembly without a major change to the machine's design. For instance, a different bottom cover and oil sump can be used to accommodate a different motor configuration. Many different components can fit within the same steel tube frame.

Although the preferred embodiment threading machines described and illustrated herein typically include two wheels, it will be appreciated that the subject matter includes the use of any number of wheels. Furthermore, it is contemplated that in addition to or instead of wheels having a fixed axis of rotation, universal wheels or caster wheels could be utilized. For example, in one version of the compact threader, a pair of locking or otherwise securable caster wheels are provided along the front of the machine and which can optionally replace stationary rubber feet. Generally, located along the rear of the machine are a pair of wheels rotatable about corresponding fixed axles. The subject matter includes the use of more than four wheels and all or a portion of the wheels being universal wheels which are preferably lockable.

References herein to the various threading machines being positionable between an operational or use position and an inclined storage position and/or an inclined transport position, refer to the use of one or more provisions which retain cutting oil such that oil does not significantly leak or spill from a generally open faced main sump portion. In addition, such references also refer to the use of one or more stability promoting provisions which enable the machine to remain in a generally upright position when in storage as compared to a generally horizontal position of the machine when in use. The stability promoting provisions as explained in greater detail herein, typically include a rearwardly extending handle with an optional stop member or region that contacts the floor upon inclination and storage of the machine.

Thus, in summary, the preferred embodiment portable threading machines are comprised of a wheel equipped steel tube frame to support the components of the machine; an extendable and latching handle; a cast body to support one or more rails and spindle of the machine; a carriage which slides on the rails and supports the threading tools, for example, cutter, reamer, die head; a lever to move the carriage on the rails; a front and rear chuck to grip a pipe in the spindle; an induction motor with gear reductions to drive the machine spindle; a switch to control the induction motor; a linecord to connect the device to a power supply; a pump operably engaged to the motor to circulate the thread cutting oil; and a bottom cover and sump to cover the internals and hold the thread cutting oil. It will be appreciated however, that the present subject matter includes threading machines having a wide array of different configurations and/or components.

FIGS. 1-4 and 5-11 illustrate a preferred embodiment threading machine 10 in accordance with the present subject matter. The preferred embodiment threading machine 10 generally comprises a tube frame 12 which supports an enclosure or body 18 and a pair of rearwardly disposed wheels 24. The tube frame 12 also supports a frontwardly disposed extendable handle assembly 36 and a carriage assembly 78. The threading machine 10 also comprises a rear chuck assembly 48 and a front chuck assembly 54. Positionably disposed on the carriage assembly 78 is a cutter 60, a die head 66, and a reamer 72.

Figure 2:
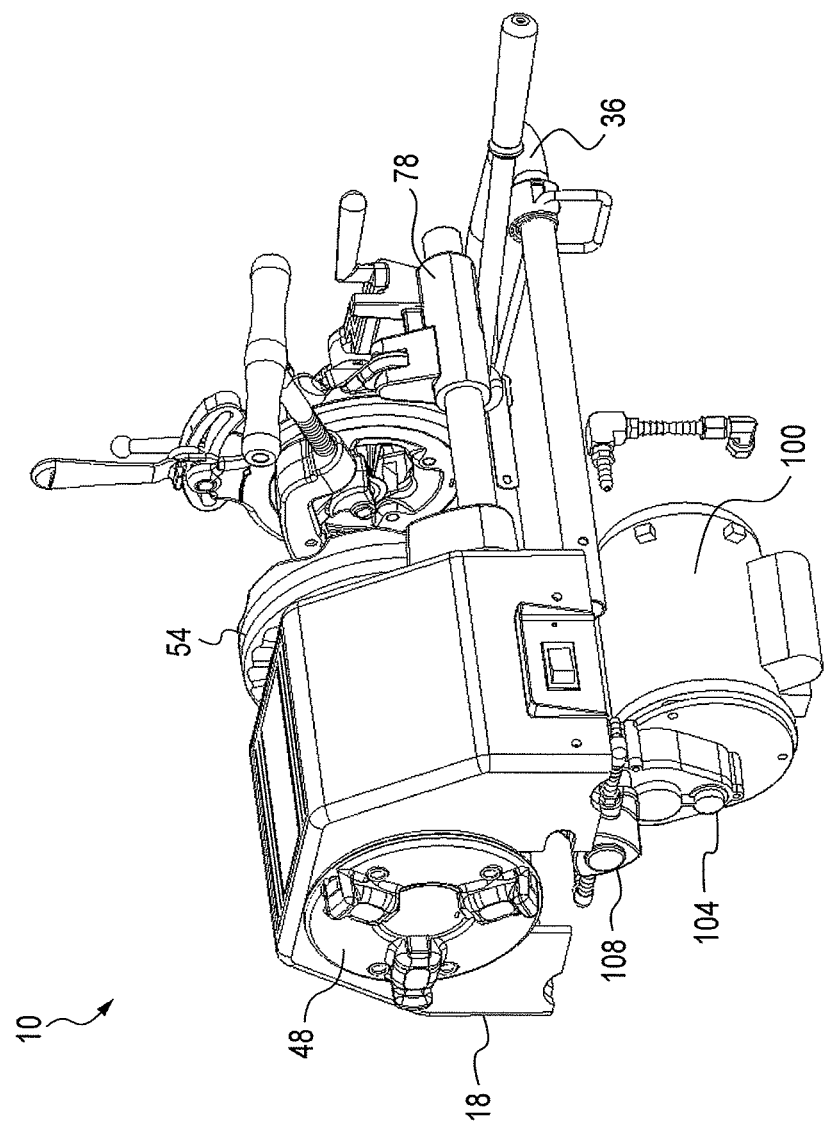
FIG. 2 is a perspective view of a motor, gearing assembly, carriage assembly, and tooling components of the preferred embodiment machine of FIG. 1, shown in isolation.

FIG. 2 illustrates a motor 100, a gear box or gear assembly 104, and a pump 108 also comprised in the preferred embodiment threading machine 10. FIG. 2 illustrates the machine 10 having various components removed including the tube frame 12 and the wheels 24, to further illustrate the noted components of the machine 10. A sump such as a preferred embodiment sump 120 depicted in FIG. 1 and described in greater detail herein, is not shown in order to reveal other components of the threading machine 10.

Figure 3:
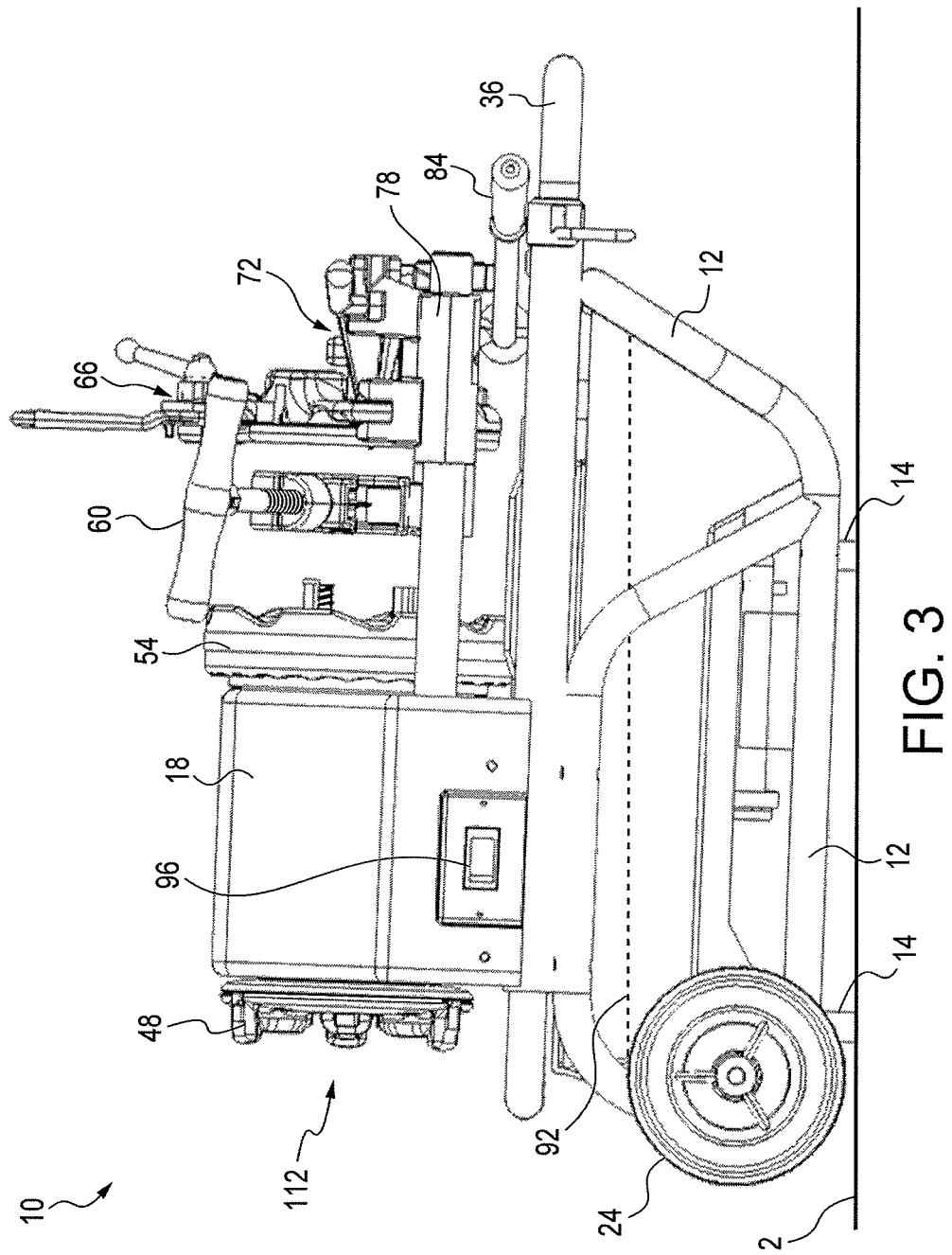
FIG. 3 is a side elevational view of the preferred embodiment threading machine of FIG. 1 in an operating position.
Figure 8:
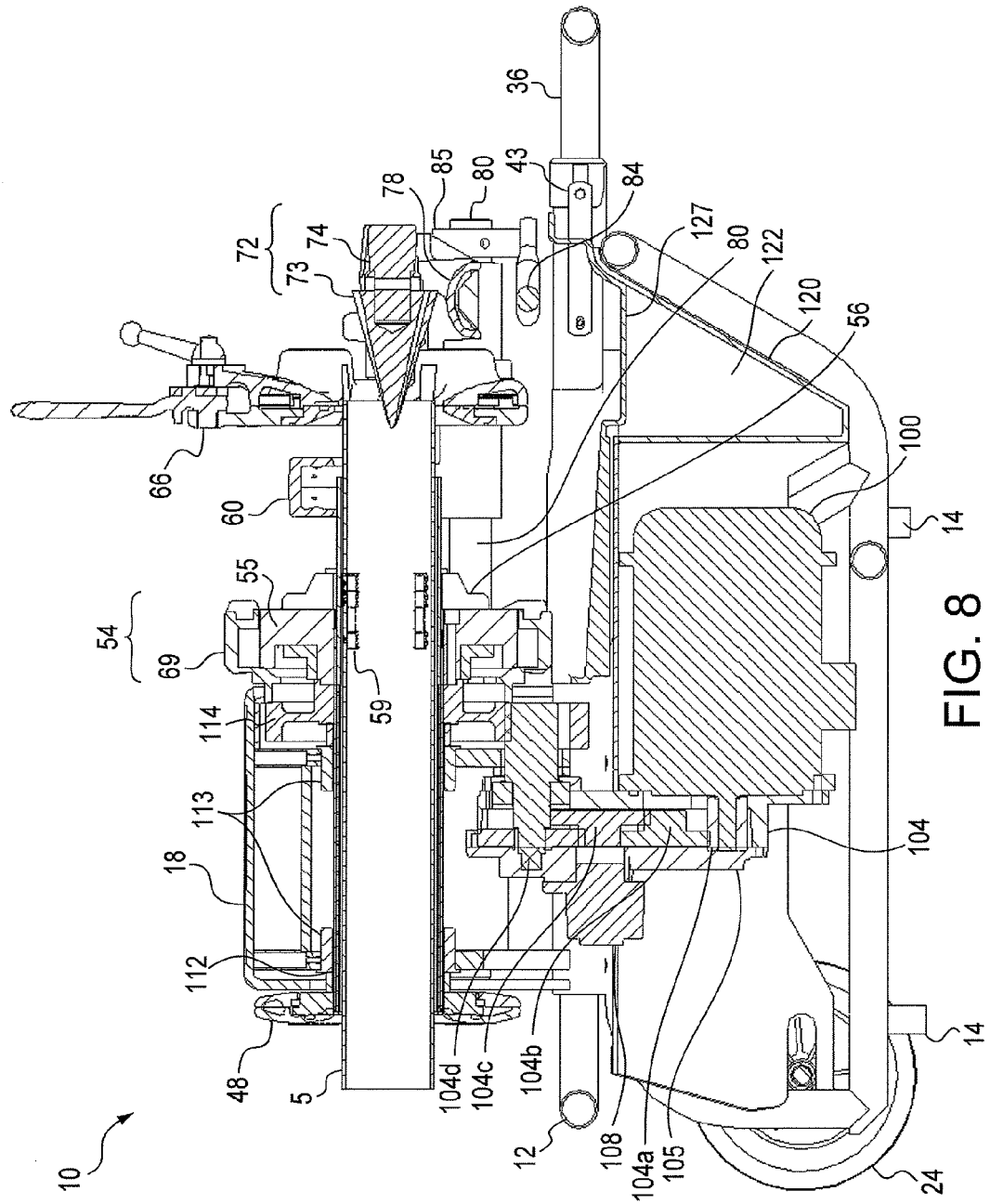
FIG. 8 is a sectional side elevational view of the preferred embodiment threading machine of FIG. 1 taken along a longitudinal centerline.

FIG. 3 illustrates the preferred embodiment device 10 in a typical or normal operating position. Feet 14 are provided on the bottom of the frame 12 to prevent or at least reduce sliding during use. The device 10 typically includes a plurality of feet 14, each located on a bottommost region of the frame 12. In the particular embodiment shown, the device 10 comprises a total of four (4) feet. However, it will be understood that the subject matter includes quantities of feet greater than or less than this number. The feet are preferably formed from any durable vibration reducing material such as for example rubber or elastomeric polymeric materials. Referring again to FIG. 3, in the use position depicted, all of the feet 14 are in contact with the floor 2, but the wheels 24 of the device 10 do not contact the floor 2. Once a workpiece or pipe 5 is secured in the front chuck and rear chuck, 54 and 48 respectively, such as shown in FIG. 8, the motor 100 is turned on or activated by a switch 96 to drive a machine spindle 112 (FIG. 8) and rotate the pipe or other workpiece. A lever 84 can be used to slide the carriage 78 into a desired position and engage the rotating pipe with the cutter 60, reamer 72, and die head 66. The pump 108 (FIGS. 2 and 8) operably engaged with the motor 100 circulates thread cutting oil through the die head and lubricates one or more chasers as a thread is formed, as is known in the art.

Figure 4:
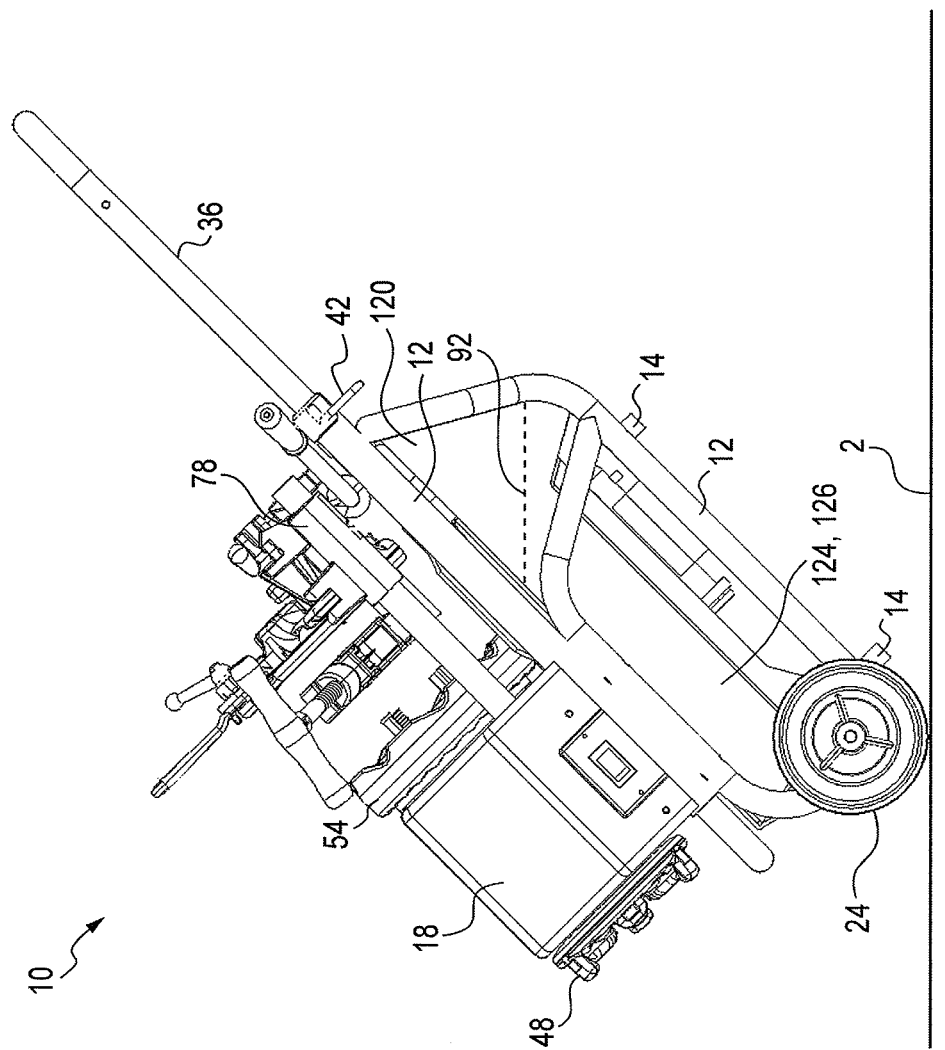
FIG. 4 is a side elevational view of the preferred embodiment threading machine of FIG. 1 in a transport position.

FIG. 4 shows the device 10 in an inclined transport position. The front handle 36 is released from the frame 12 by activating a latch assembly 42. In certain applications, the latch assembly 42 is similar to that used on a commercially available RIDGID K400 machine from Ridge Tool Company of Elyria, Ohio. However, it will be understood that a wide array of latches and latch assemblies can be used. The handle 36 is extended from the device 10 and locked or otherwise secured into place with the latch assembly 42. The device 10 is inclined by the operator at the front of the device using the extended front handle 36. As the handle 36 is raised, the rear wheels 24 come into contact with the floor 2. Also, oil contained in a main sump portion of the sump is transferred into transport sump portions as described in greater detail herein. In this transport position, a user can easily roll the device 10 into place or to a desired location. Once in place, the handle 36 is lowered to allow the feet 14 to contact the floor 2. The extended handle 36 is returned to its original retracted position and the device 10 is returned to the normal operating position such as shown in FIG. 3.

Figure 5:
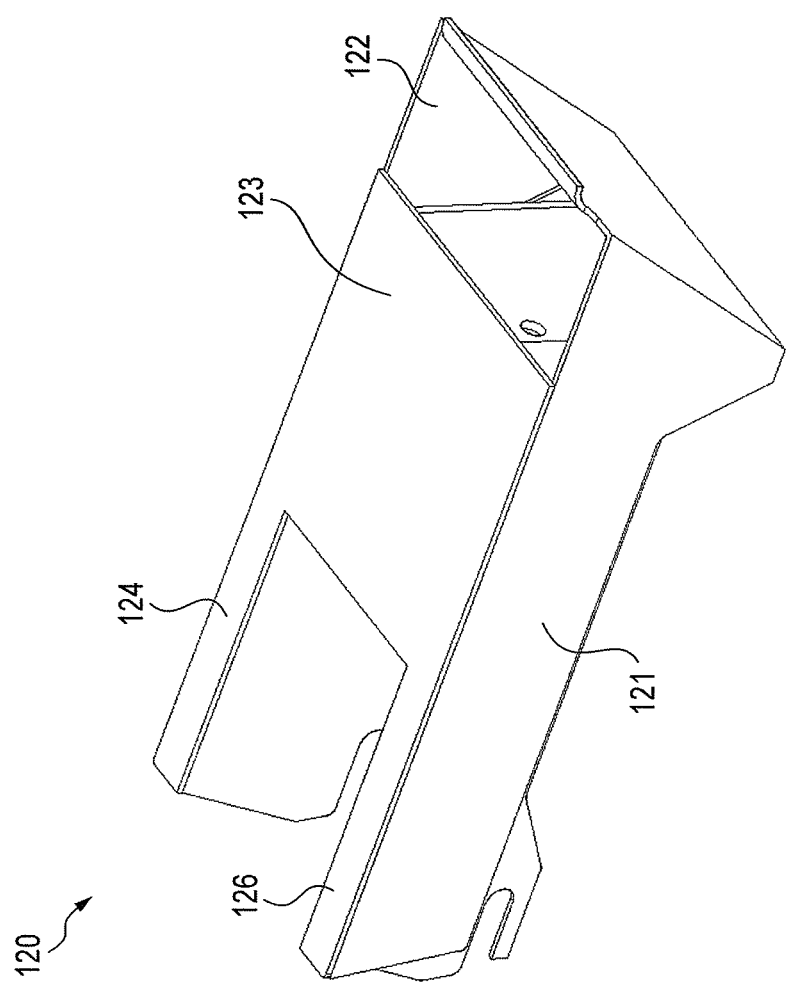
FIG. 5 is a perspective view of a sump tray of the preferred embodiment threading machine of FIG. 1.

FIG. 5 illustrates a preferred version of the sump 120 used in the preferred embodiment threading machine 10. The preferred embodiment sump 120 includes a main sump portion 122 which is located toward the front of the threading machine 10, and one or more transport sump region(s) 124, 126 which extend from the main sump portion 122 toward the rear of the threading machine 10. As previously noted, the main sump portion 122 and the transport region(s) 124, 126 are in fluid communication with one another such that cutting oil contained in the sump 120 can flow between these regions. As depicted in FIG. 5, the main sump portion 122 includes an open upwardly directed face for receiving cutting oil typically applied to a workpiece and tool(s) positioned above the sump 120. The main sump portion 122 also typically includes an oil filter, hose fittings, and lines (not shown) to transport the oil from the pump. The transport region(s) 124, 126 of the sump 120 are generally enclosed by a top wall 123, one or more side walls 121, and a bottom wall 126 (FIG. 10) and thus serve to retain cutting oil therein when the preferred embodiment threading machine 10 is in an orientation or position other than that associated with normal use, for example during transport or storage. Oil from the threading machine main sump passes into the transport sump portion(s) 124, 126 during transport and storage of the machine 10.

Figure 6:
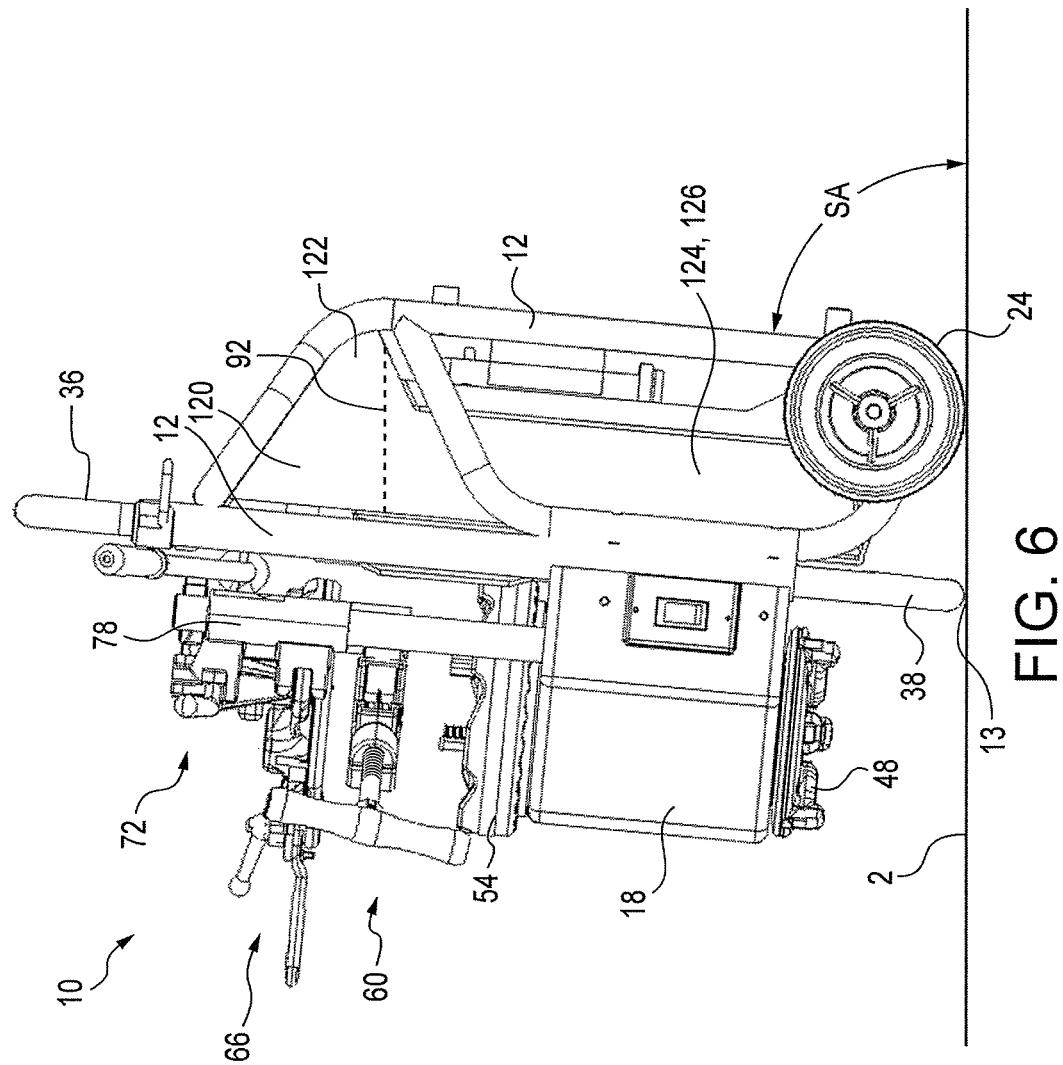
FIG. 6 is a side elevational view of the preferred embodiment threading machine of FIG. 1 in a storage position.

FIG. 6 shows the unit 10 in a storage position. To assist placing the unit in a storage position, the front handle 36 is released from the frame 12 and used to lift the machine 10 to the storage position shown. A stop 13 on a rear handle 38 of the tubing frame 12 retains the unit 10 in an upright orientation. A slight angle past vertical is preferably maintained in the orientation of a longitudinal axis of the frame 12 relative to the floor 2, to prevent the cutter 60, reamer 66 and die head 72 from swinging out of contact with the carriage 78. This angle is depicted in FIG. 6 and described herein as a storage angle "SA." The threading machines of the present subject matter can be configured to exhibit a storage angle when placed into a storage position, of from about 89° to about 70°, and typically from about 85° to about 75°, relative to the floor 2. Also, when the unit 10 is placed into the storage position, the oil flows into the transport sump portion(s) 124, 126 without spilling. Once the unit 10 is upright and resting on the stop 13, the extended front handle 36 is returned to its original position.

Figure 7:
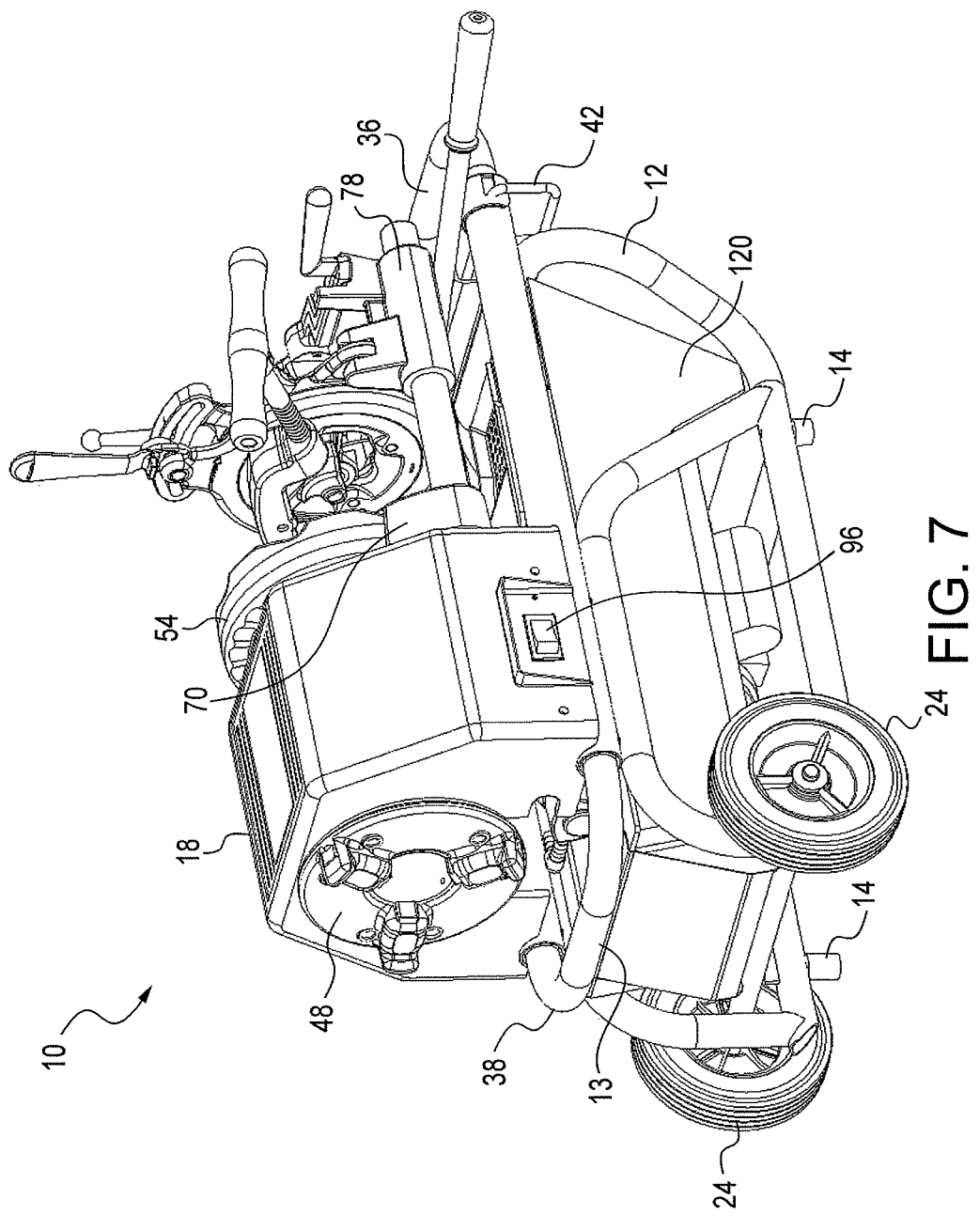
FIG. 7 is a rear perspective view of the preferred embodiment threading machine of FIG. 1.

FIG. 7 is a rear perspective view of the preferred embodiment threading machine 10 in accordance with the present subject matter. The device 10 is shown in a use position in which the wheels 24 are not in contact with the floor, and instead the device 10 is entirely supported on feet 14. FIG. 7 also illustrates the stop member 13 which can be provided along a rear handle 38. FIG. 7 also illustrates a latch handle 42 for selectively releasing and/or retaining the front handle 36. And, FIG. 7 depicts a bumper 70 provided on a frontwardly directed region of a hammer wheel guard typically included in threading machines.

Figure 9:
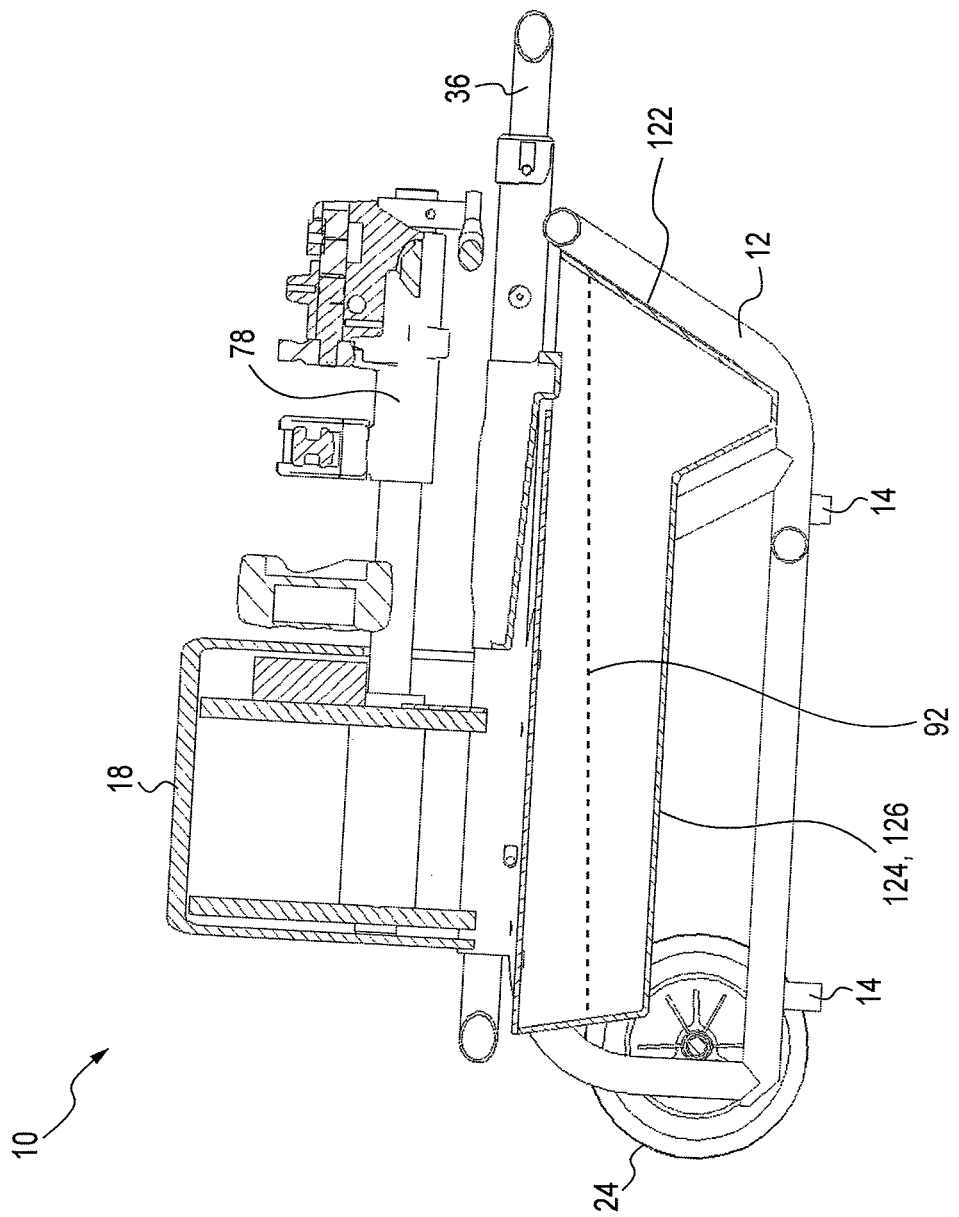
FIG. 9 is a sectional side elevational view of the preferred embodiment threading machine of FIG. 1 taken parallel to the longitudinal centerline illustrating the threading machine and its sump tray in a normal operating position.
Figure 10:
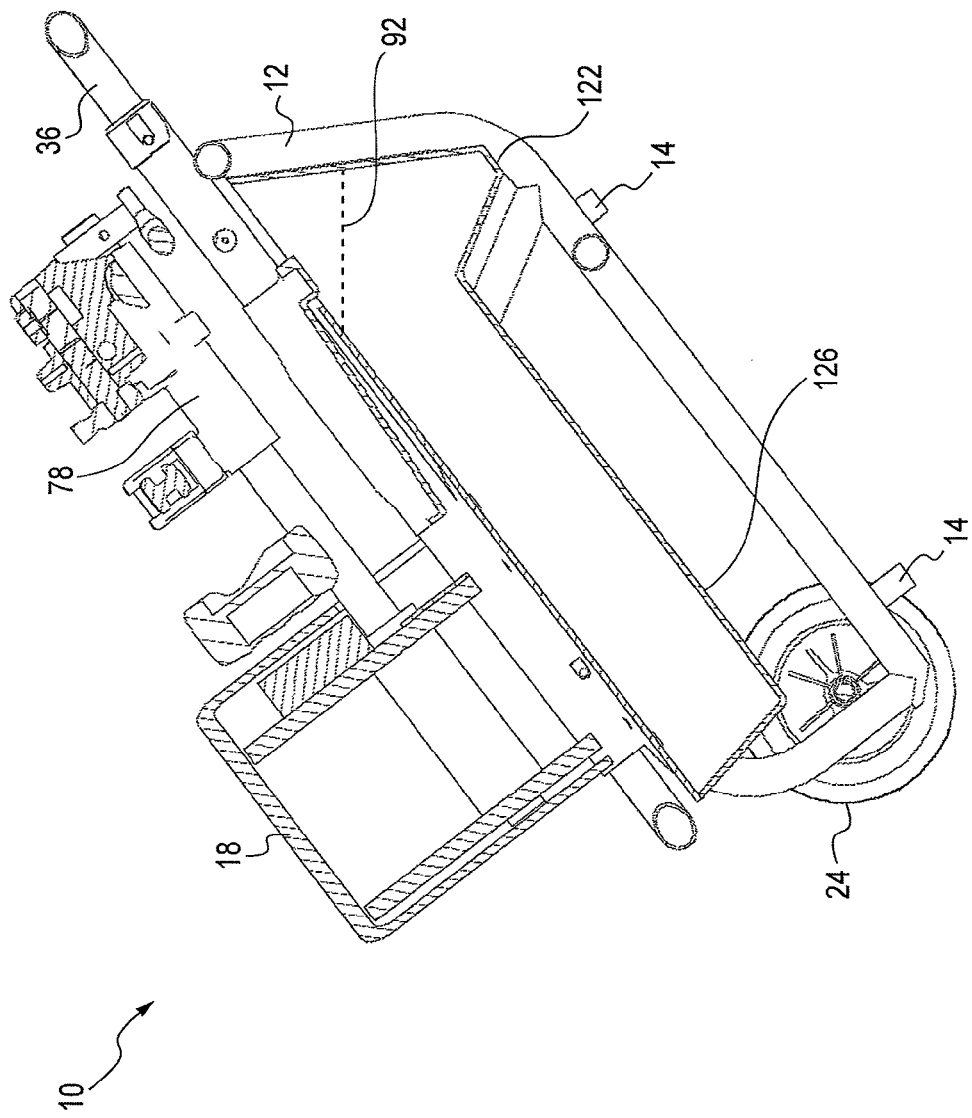
FIG. 10 is a sectional side elevational view of the preferred embodiment threading machine of FIG. 1 taken parallel to the longitudinal centerline illustrating the threading machine and its sump tray in a transport position.

FIGS. 8-11 are various cross sectional views further illustrating the preferred embodiment threading device 10, various components used therein, and the arrangement and relationship between the components. An operational or use position is depicted in FIG. 9. As previously noted, in this position, all of the feet 14 contact the floor, and the wheels 24 do not contact the floor. Typically, when the device is in an operational position, the longitudinal axis of a workpiece retained or secured in the device is horizontal or substantially so. A transport position is shown in FIG. 10. In certain embodiments of the threading device, the device is positionable between (i) an operational or use position, (ii) a storage position, and (iii) a transport position. Preferably, the threading device can be placed into each of these positions and transported without the need for accessories or additional components such as provisions or assemblies for securing various components. FIGS. 3, 4, 6, 9, and 10 illustrate the level or top surface of a quantity of cutting oil retained in the sump 120, in various orientations of the machine 10. Specifically, FIGS. 3 and 9 show the oil level 92 in the sump 120 when the machine 10 is in a use position. As evident, the oil is in the main sump portion 122 and the one or more transport region(s) 124, 126. FIGS. 4 and 10 show the oil level 92 in the sump 120 when the machine 10 is in an inclined transport position. And, FIG. 6 shows the oil level 92 in the sump 120 when the machine 10 is in a storage position.

Specifically, FIG. 8 illustrates the device 10 and the motor 100 which drives the gear assembly 104 which transmits rotary power to the spindle 112 which engages a workpiece such as a pipe 5. The gear assembly 104 includes a motor pinion 104a, a second intermediate gear set 104b, a third intermediate gear set 104c, and a main drive pinion 104d. The main drive pinion 104d engages a spindle drive gear 114. The spindle drive gear 114 engages a hammer wheel 69 which in turn drives a chuck body 55 of the front chuck assembly 54. The front chuck assembly 54 includes a chuck jaw 56. One or more chuck inserts 59 may be used. Rotation of the spindle 112 is supported by one or more spindle bearings 113. The gear assembly 104 is typically enclosed yet may be accessed via one or more gearbox covers 105.

FIG. 8 additionally illustrates the cutter 60, the die head 66, and the reamer 72, all of which are typically positionably supported on the carriage 78. The reamer 72 includes a reamer cone 73 supported from a reamer arm 74. The carriage 78 is slidably positionable on carriage rails 80 and can be selectively retained along the rails 80 by a carriage lever 84. A carriage collar 85 can be used to engage the carriage 78 to the carriage lever 84. FIG. 8 also depicts the extendable handle 36 and a biasing member or spring 43 for selectively extending or retaining the handle 36. FIG. 8 also illustrates a chip tray 127 positioned along the open face of the main sump portion 122 of the sump 120.

Figure 11:
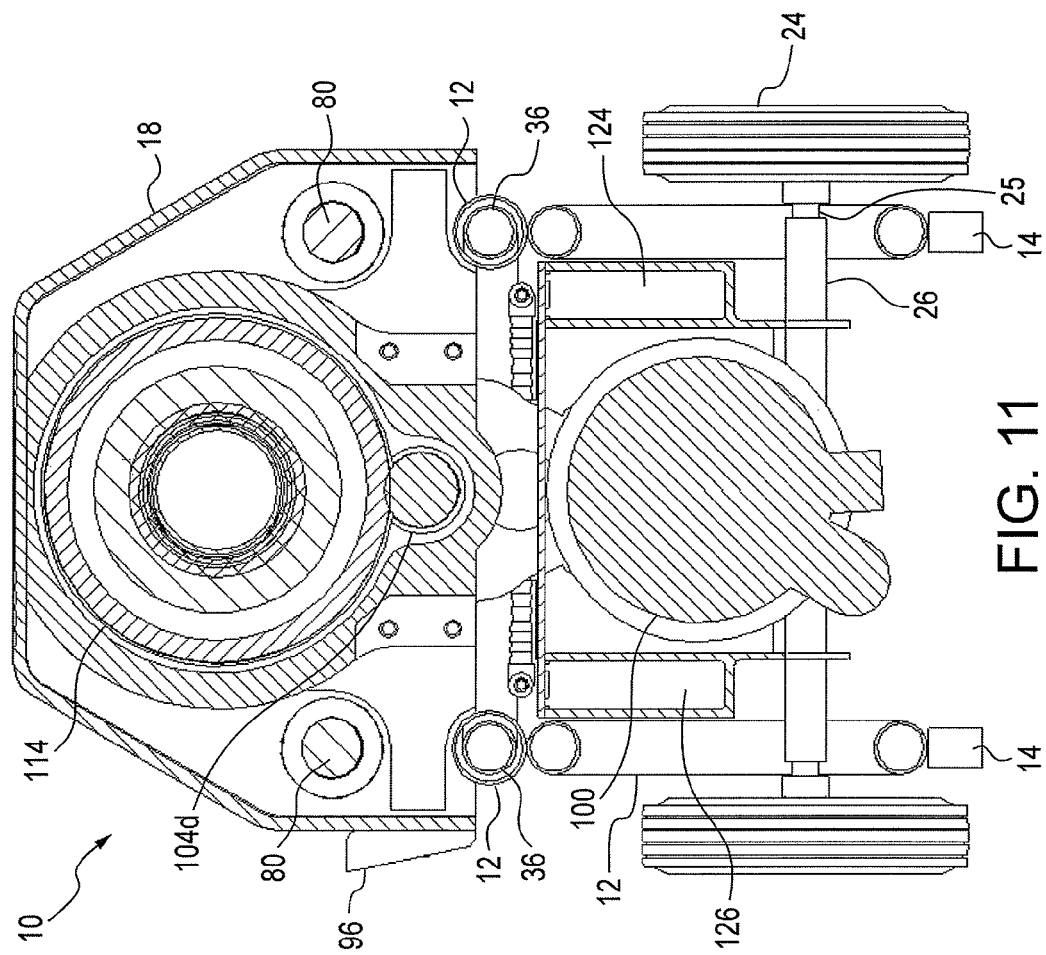
FIG. 11 is a sectional view of the preferred embodiment threading machine of FIG. 1 taken along a plane perpendicular to a longitudinal centerline illustrating positions of a motor and gearing assembly.

FIG. 11 is a cross sectional view of the device 10 further illustrating positions and relationships of the various components. FIG. 11 illustrates a view from the front of the device 10. Specifically, FIG. 11 depicts the motor 100 disposed between two transport sump portions 124 and 126 of the sump assembly 120 generally shown in FIG. 5. Also, the main drive pinion 104d and its engagement with the spindle gear 114 is shown. A pair of carriage rails 80 is shown, each of which are generally positioned above and parallel to portions of the extendable handle 36. The pair of wheels 24 are typically rotatably engaged to the frame 12 by an axle 25 and axle housing 26.

Figure 12:
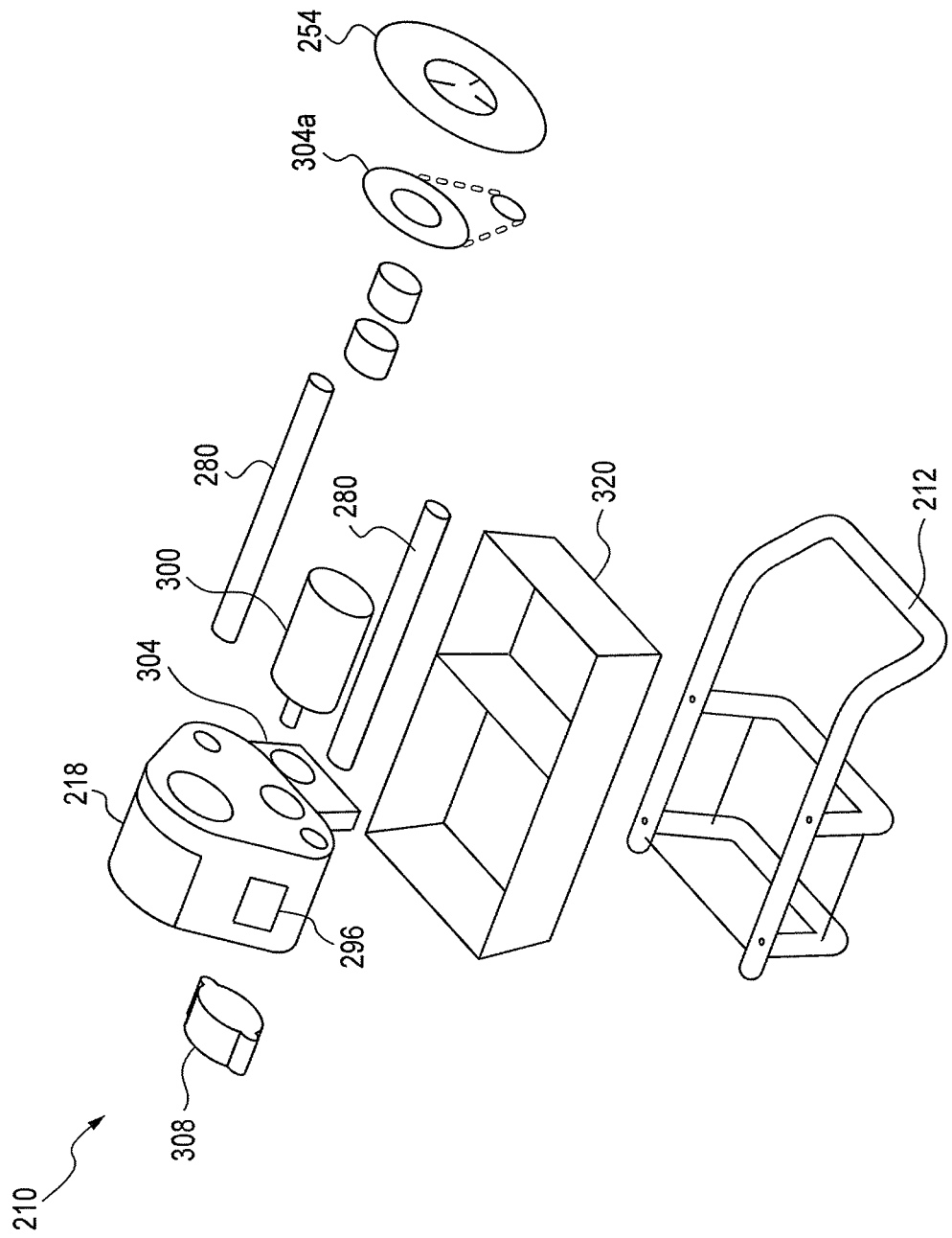
FIG. 12 is an exploded view of a pump, motor, drive assembly, sump tray, and frame utilized in another preferred embodiment threading machine in accordance with the present subject matter.

FIG. 12 is an exploded view of another version of a pump, motor, drive assembly, sump tray, and frame used in a preferred embodiment threading machine. Specifically, FIG. 12 illustrates various components of another preferred embodiment threading machine 210 in accordance with the present subject matter. The machine 210 generally corresponds to the previously described threading machine 10 of FIGS. 1-11, but utilizes an alternate sump assembly and drive assembly for transmitting rotary motion to a workpiece. The threading machine 210 comprises a tube frame 212, a sump assembly 320, a pump 308, a gear assembly 304, and a motor 300. The frame 212 supports the previously noted components and a body 218. A switch such as a pushbutton switch 296 can be provided on the body 218 to control operation of the motor 300. The machine 210 also comprises a pair of carriage rails 280. Rotary motion to a workpiece (not shown) is transmitted by a drive sprocket and chain assembly 304a which is engageable with the gearbox 304. A reversible chuck 254 serves to releasably engage a workpiece (not shown). This version of threading machine may be preferred as this version is free of relatively costly multiple gear assemblies such as 104b and 104c, and other components, as shown in FIG. 8 and described in conjunction with the preferred embodiment device 10.

FIGS. 13-24 are views of another preferred embodiment threading machine 410 in accordance with the subject matter. This version includes many if not all of the previously described features and components of the preferred embodiment machine 10 depicted in FIGS. 1-11. The preferred embodiment threading machine 410 comprises a tube frame 412 having a pair of rearwardly disposed wheels 424 rotatably affixed thereto. The frame 412 includes a plurality of feet 414 disposed along the bottom most regions of the frame 412. The frame 412 supports an enclosure or a body 418. The machine 410 also comprises a frontwardly located extendable handle 436 which is selectively extended, retracted, and/or retained by use of a latch assembly 442. The machine 410 also includes a rear handle 438. The threading machine 410 comprises a sump assembly 520 similar to the previously described sump assembly 120 of the device 10 of FIGS. 1-4 and 6-11, and as shown in FIG. 5. The threading machine 410 comprises a pair of carriage rails 480 which support a slidable carriage 478. The carriage 478 supports one or more components such as a cutter 460, a die head 466, and a reamer 472. A switch 496 controls operation of a motor 500 (FIGS. 20-22) which provides powered rotation for a workpiece when engaged and positioned within the machine 410.

Figure 13:
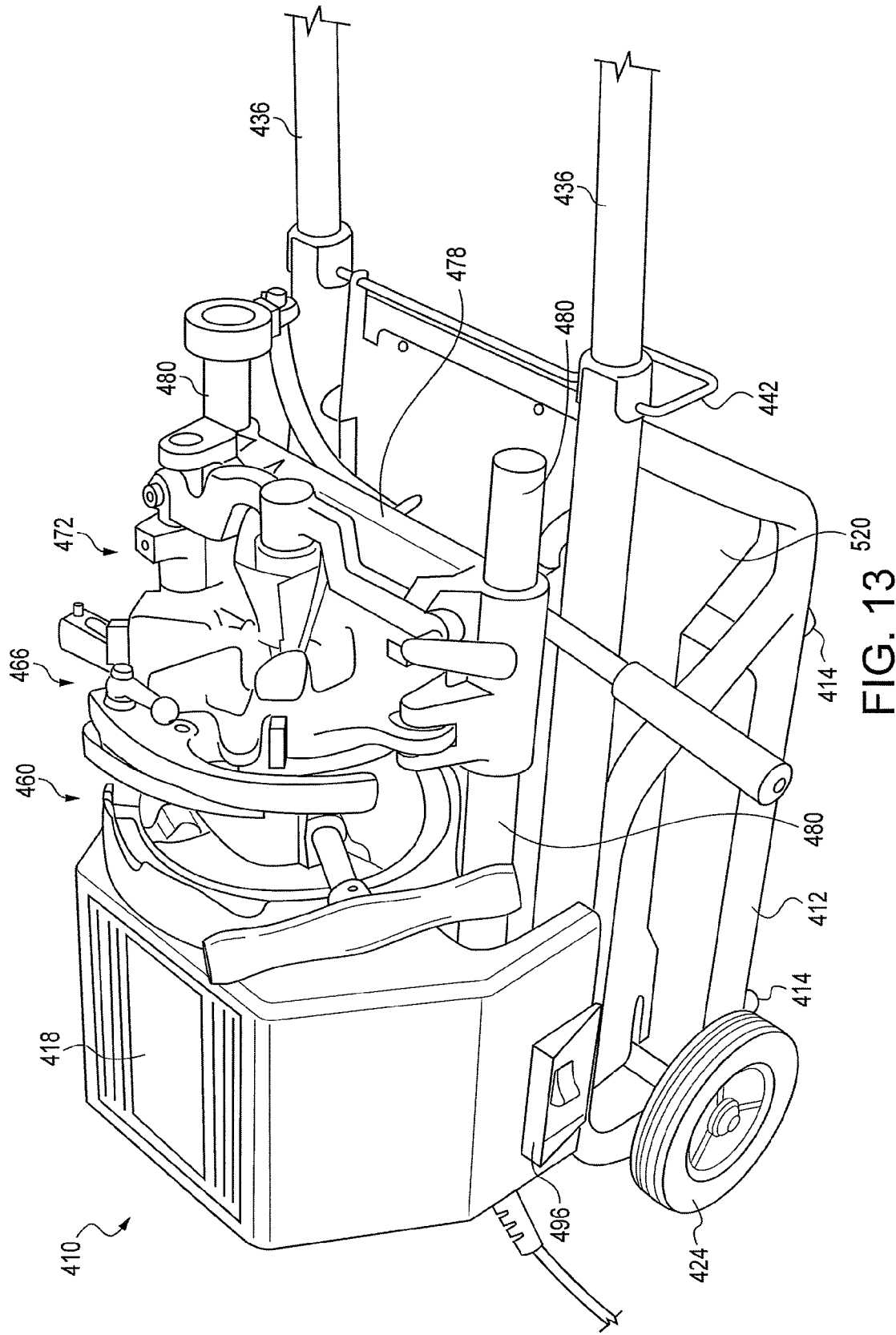
FIG. 13 is a perspective view of another preferred embodiment threading machine in accordance with the present subject matter.
Figure 14:
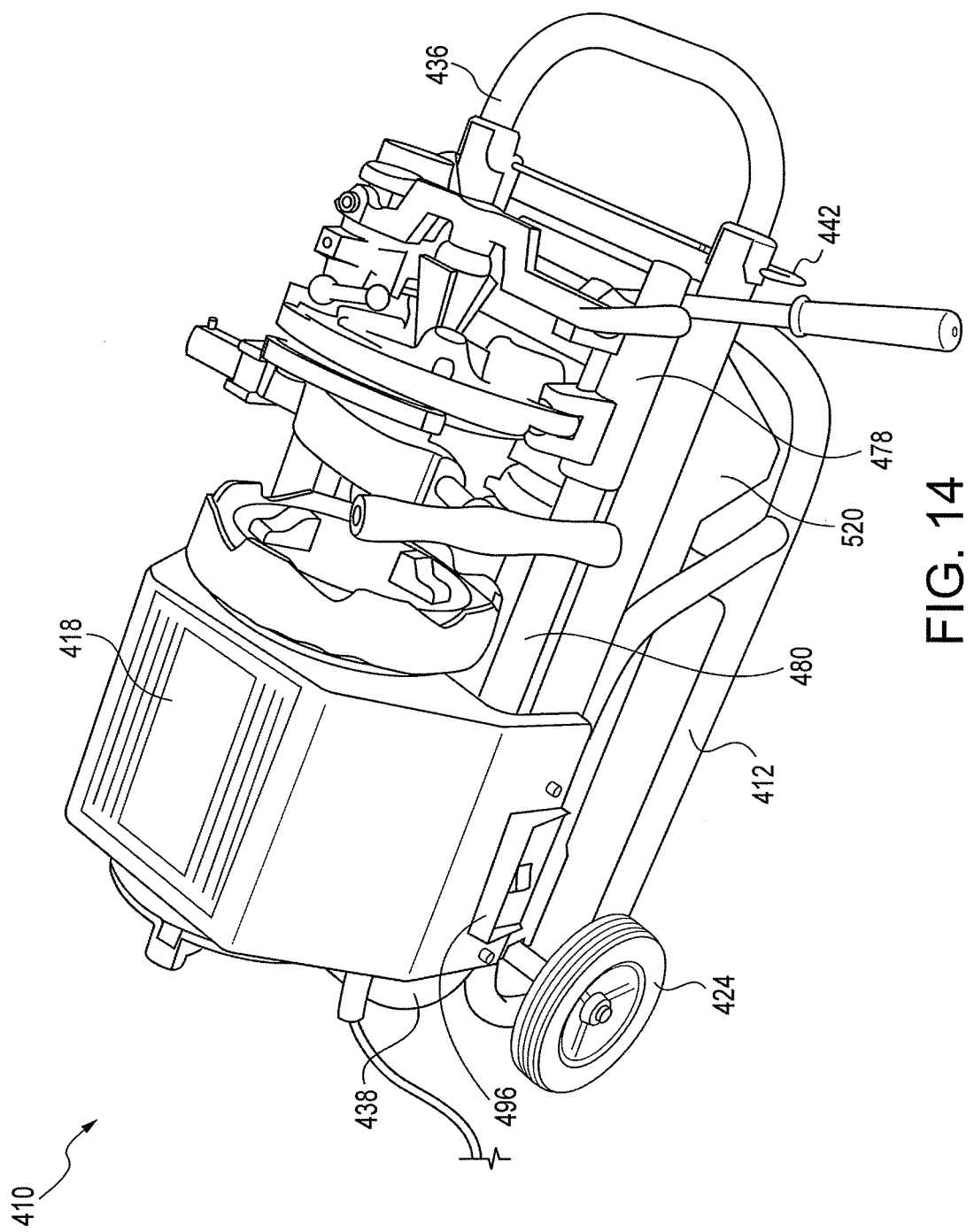
FIG. 14 is another perspective view of the preferred embodiment threading machine of FIG. 13.

FIG. 14 illustrates the preferred embodiment machine 410 depicted in FIG. 13 in which the carriage 478 and associated components are slid or positioned to a frontmost location.

Figure 15:
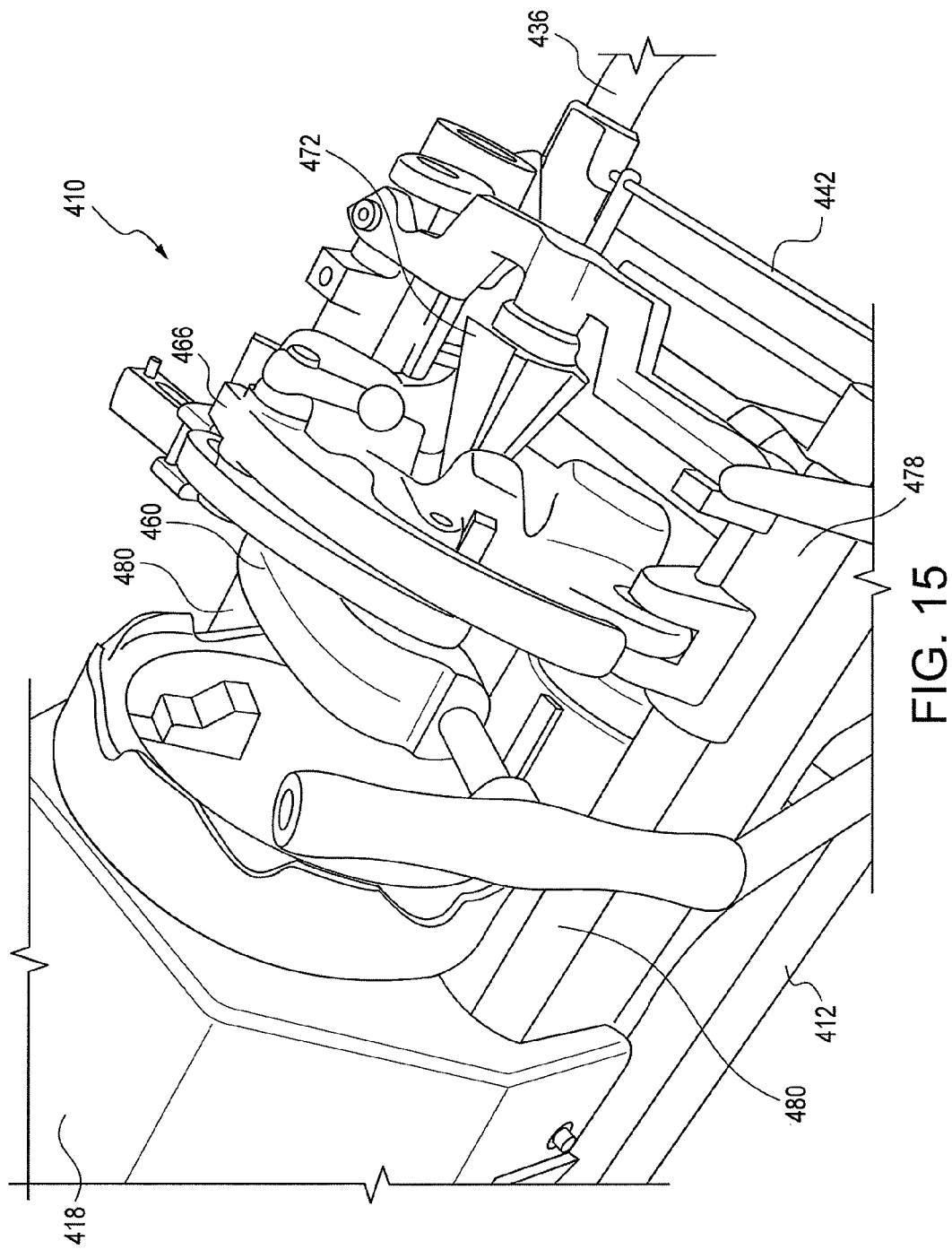
FIG. 15 is a detailed view of a carriage assembly and associated components of the preferred embodiment threading machine of FIG. 13.

FIG. 15 is a detailed view of the preferred embodiment machine 410 further illustrating the cutter 460, the die head 466, and the reamer 472.

Figure 16:
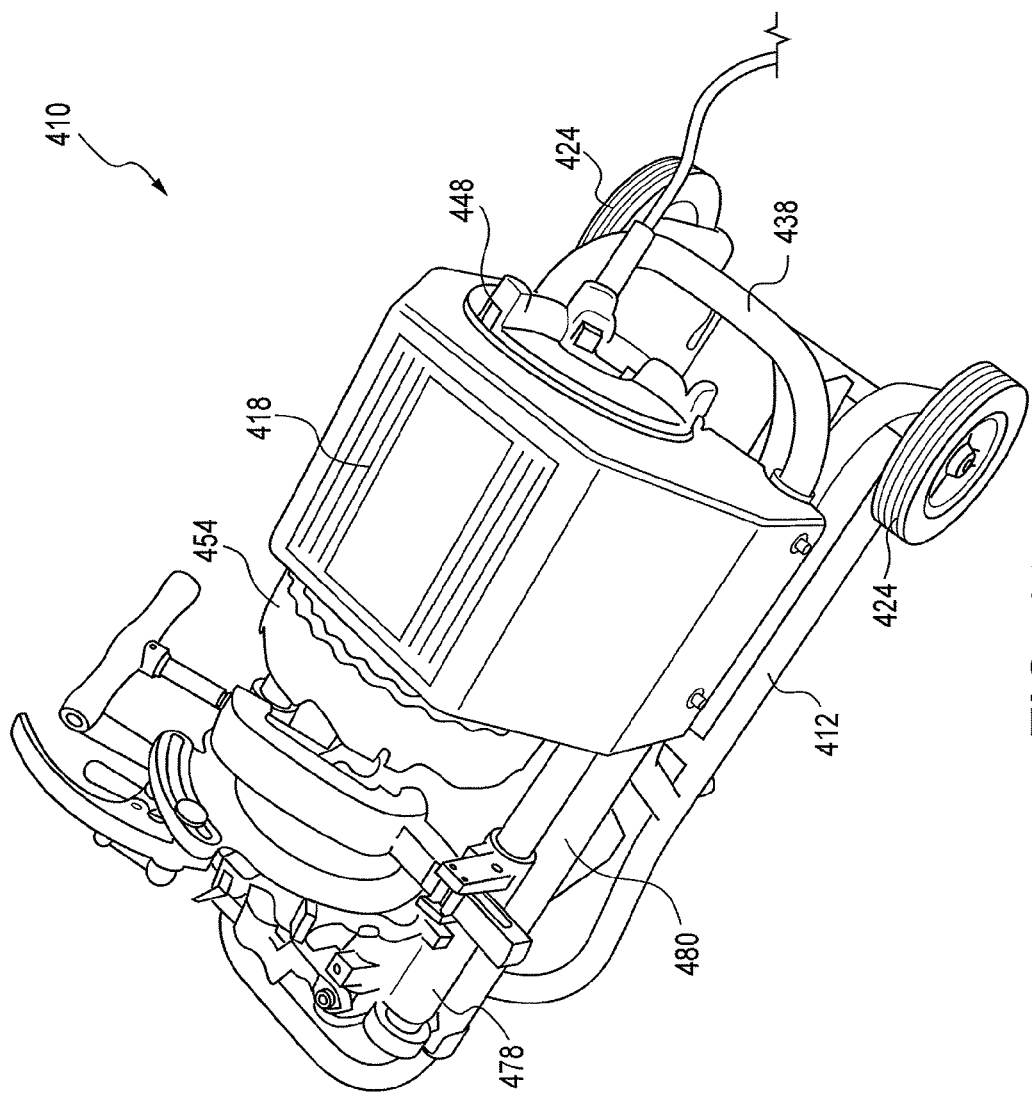
FIG. 16 is another perspective view of the preferred embodiment threading machine of FIG. 13.

FIG. 16 is another view of the preferred embodiment machine 410 further illustrating a preferred configuration for the frame 412 and the wheels 424. The frame 412 includes a rearwardly extending rear handle 438. The body 418 is generally disposed between a front chuck assembly 454 and a rear chuck assembly 448.

Figure 17:
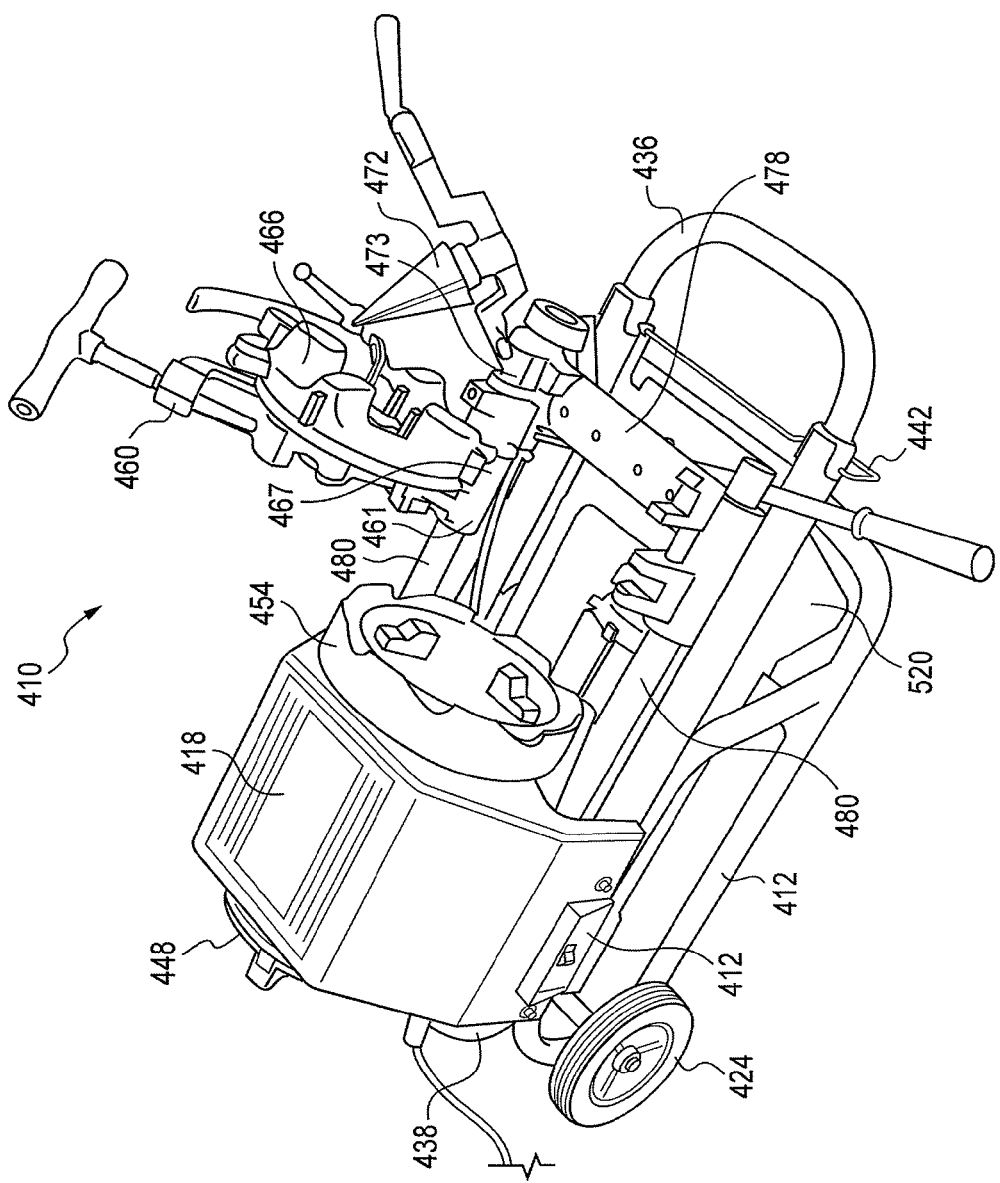
FIG. 17 is a perspective view of the preferred embodiment threading machine of FIG. 13 illustrating alternate positions for the carriage assembly and associated components.

FIG. 17 illustrates the threading machine 410 and the various carriage components positioned in an access state. Specifically, as shown the carriage 478 is slidably positioned on the pair of spaced apart and parallel carriage rails 480. The cutter 460 is pivotally affixed to the carriage 478 at a cutter base 461. Similarly, the die head 466 is pivotally affixed to the carriage 478 at a die head base 467. And, the reamer 472 is pivotally affixed to the carriage 478 at a reamer base 473.

Figure 18:
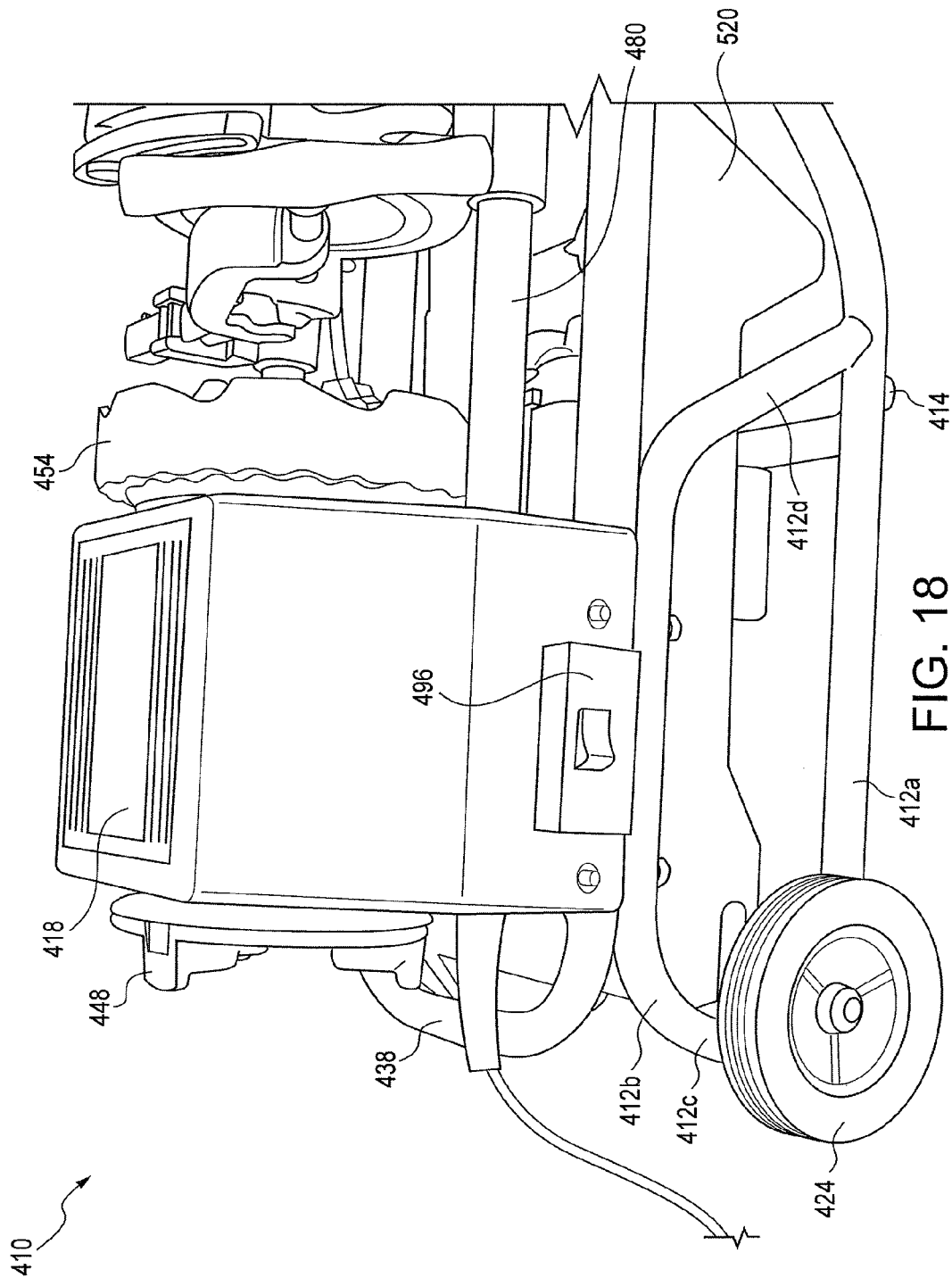
FIG. 18 is a detailed view of a rearward portion of the preferred embodiment threading machine of FIG. 13.

FIG. 18 illustrates a rearward side portion of the threading machine 410 and a preferred configuration of the tube frame 412. Specifically, the tube frame 412 includes a lower frame portion 412a and an upper frame portion 412b generally extending above, spaced from, and parallel to the lower frame portion 412a. The pair of wheels 424 and a corresponding axle (not shown) are disposed along a rearward and lower region at which the upper and lower frame portions 412b and 412a are affixed or engaged with one another. Two or more connecting frame portions are provided which extend between the upper and lower frame portions 412b and 412a, respectively. For example, a rear inclined connecting frame portion 412c and a forward connecting frame portion 412d can be provided. In certain versions of the present subject matter, one or more frame portions can be integrally formed with one another such as 412c, 412b, and 412d. Preferably disposed above the upper frame portion 412b and at least partially contacting the portion 412b is the rear handle 438.

Figure 19:
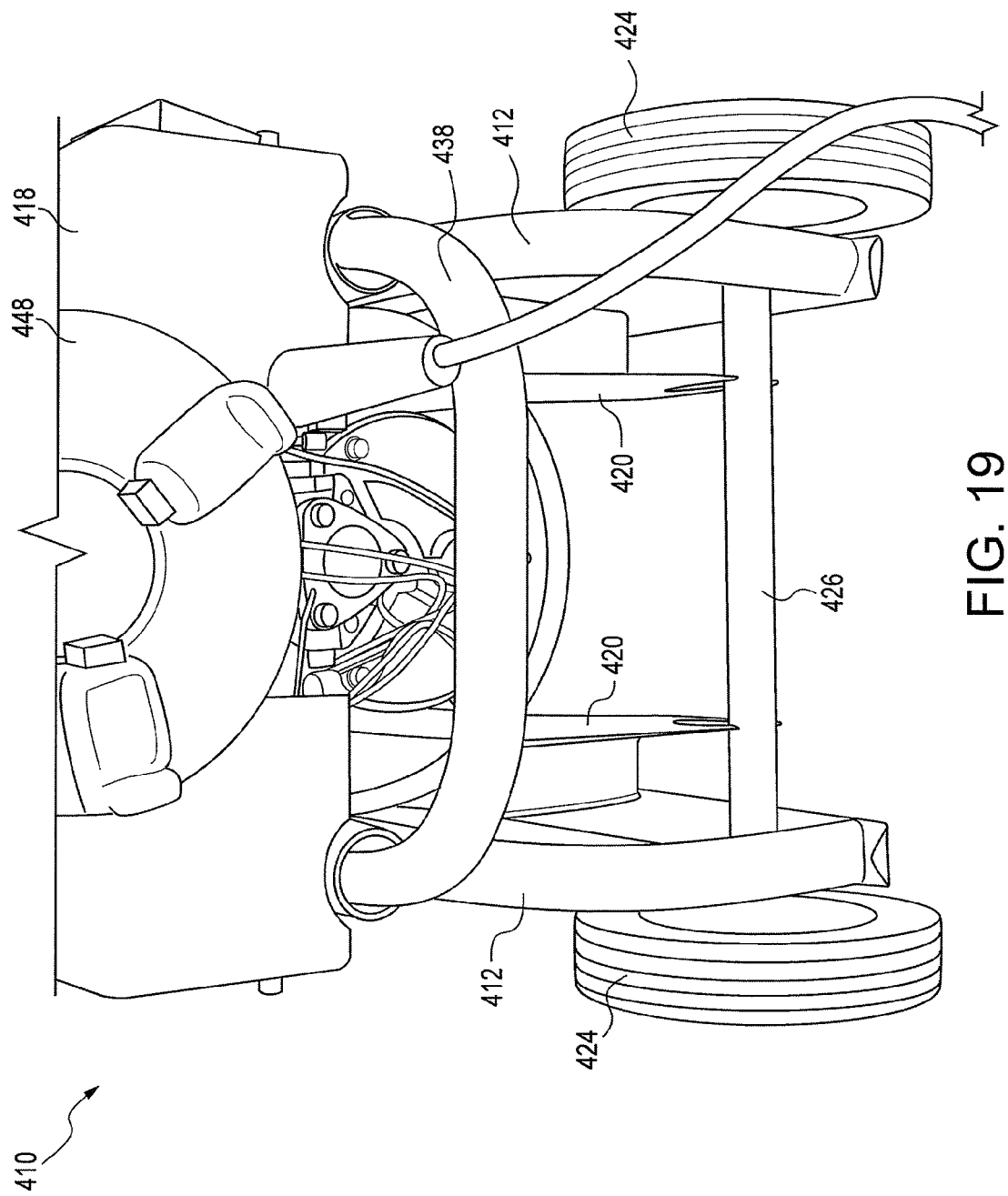
FIG. 19 is a partial end view of the rear of the preferred embodiment threading machine of FIG. 13.

FIG. 19 is a view of the rear of the preferred embodiment machine 410 further illustrating a configuration for the frame 412, the rear handle 438, and the wheels 424. The wheels 424 are rotatably supported by an axle housing 426 which extends between two side assemblies of the tube frame 412. Typically, the axle housing 426 is transversely oriented relative to the side assemblies of the frame 412. And, typically, the axle housing 426 is oriented parallel with at least a centrally located portion of the rear handle 438.

Figure 20:
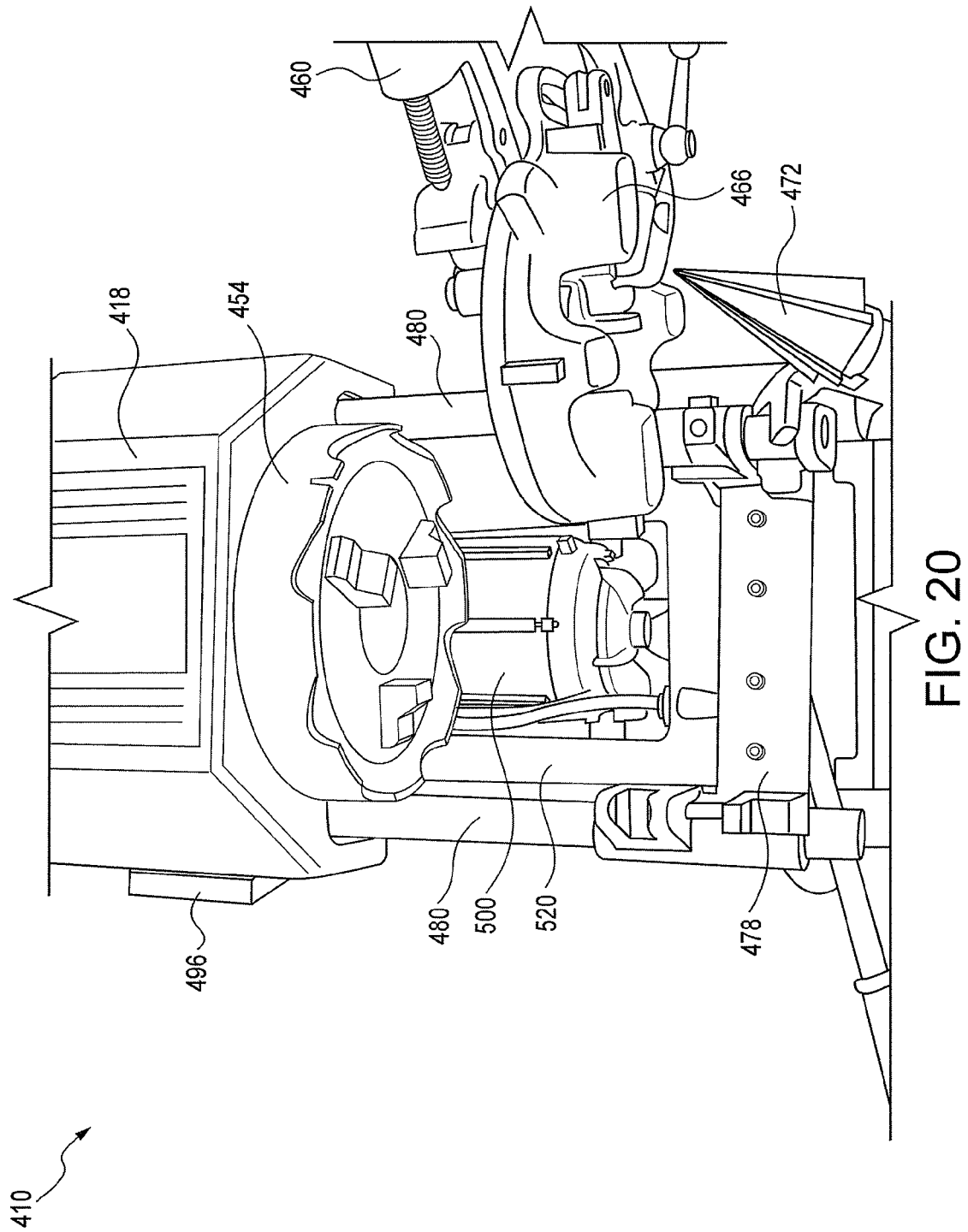
FIG. 20 is a top view of the preferred embodiment threading machine of FIG. 13.

FIG. 20 is a top view of the preferred embodiment machine 410 further revealing additional aspects of the device. Specifically, the cutter 460, the die head 466, and the reamer 472 are pivoted in their corresponding access positions to reveal a motor 500 and sump assembly 520.

Figure 21:
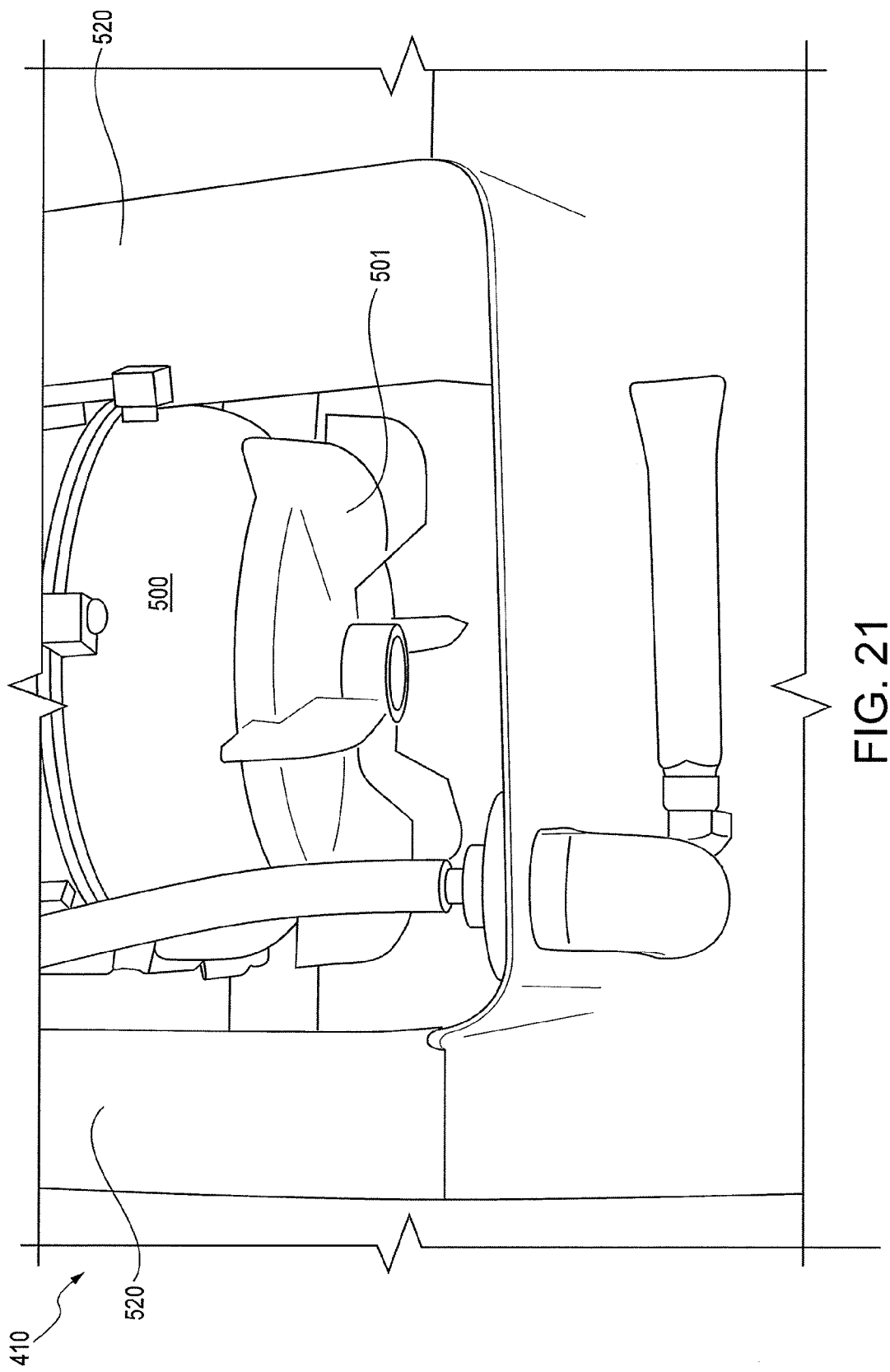
FIG. 21 is a detailed view of a motor and fan assembly of the preferred embodiment threading machine of FIG. 13.

FIG. 21 is a detailed view of the motor 500 and a fan assembly 501 for displacing air around and/or about the motor 500 to cool the motor. The motor 500 and fan assembly 501 are positioned within a hollow region of the sump assembly 520.

Figure 22:
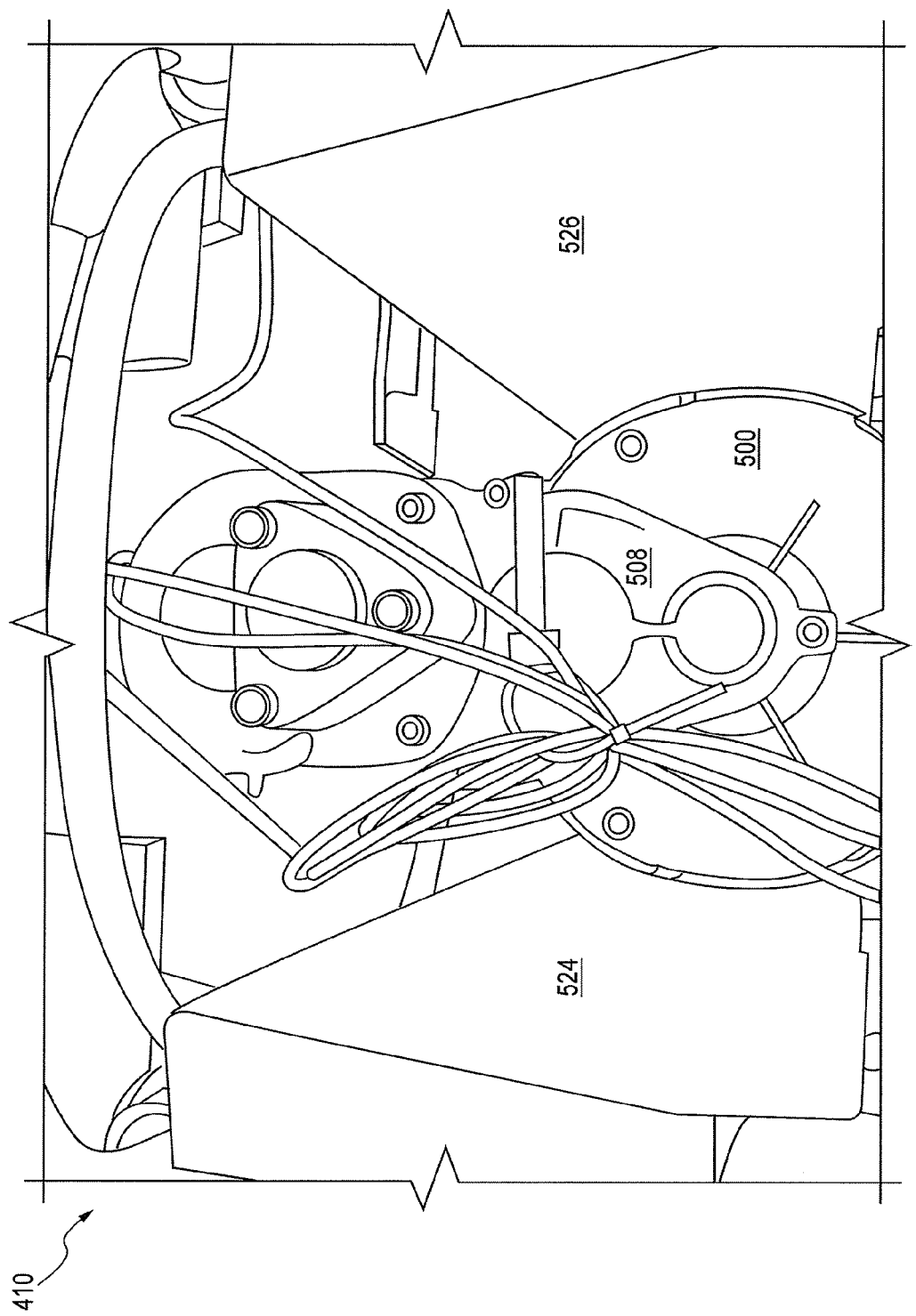
FIG. 22 is a detailed view of the rear end of the preferred embodiment threading machine of FIG. 13.

FIG. 22 is a detailed rear end view of the preferred embodiment machine 410 showing the motor 500 and an oil pump 508 for transferring cutting oil throughout the machine 410. FIG. 22 also illustrates the motor 500 being disposed between two transport sump regions 524 and 526 of the sump assembly 520.

Figure 23:
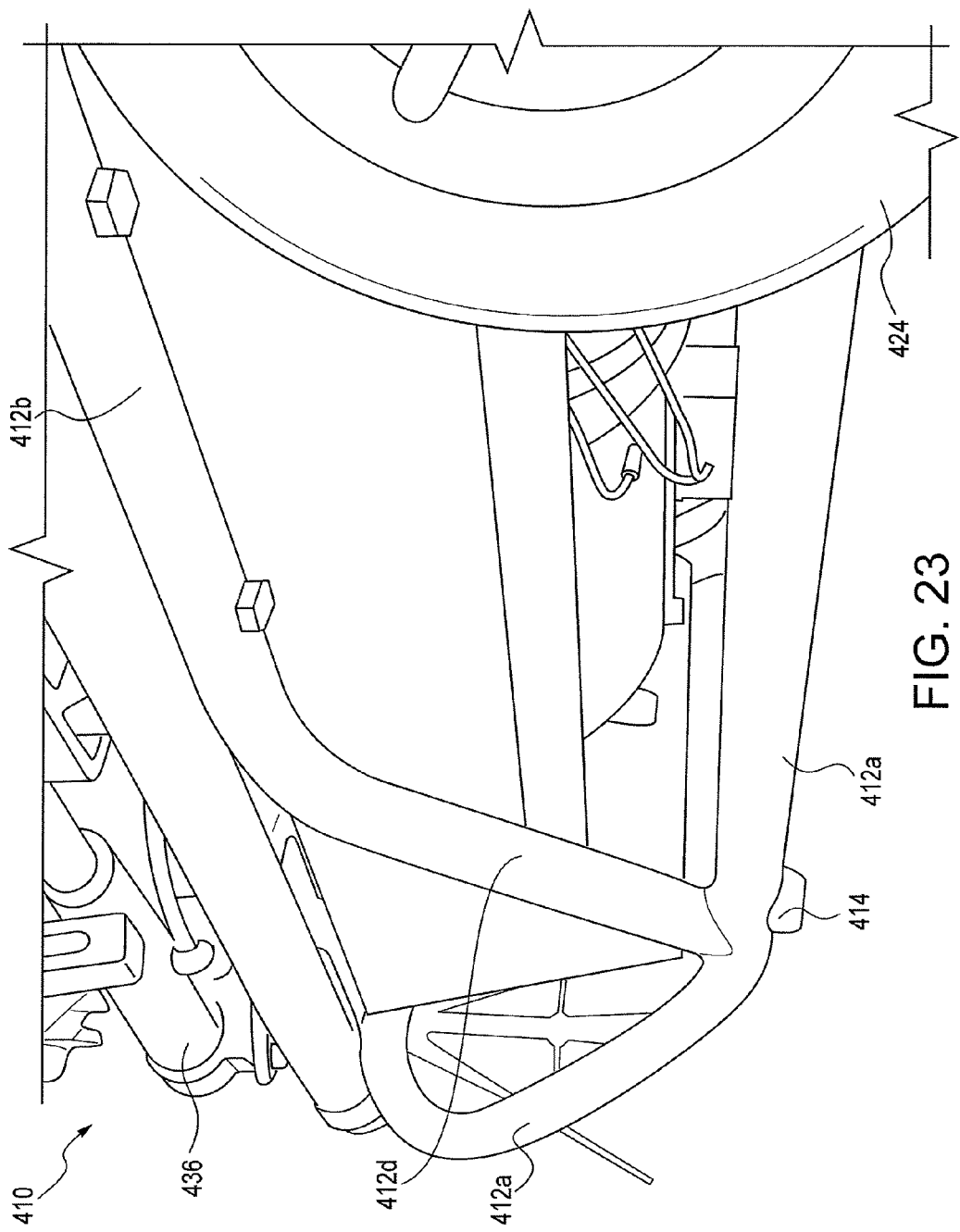
FIG. 23 is a detailed view of a lower side portion of the preferred embodiment threading machine of FIG. 13.

FIG. 23 is a detailed side view of the preferred embodiment machine 410 showing a side portion of the tube frame 412. As shown, a forwardly disposed inclined frame portion 412d is affixed to the lower frame portion 412a at a location corresponding to the location at which a foot 414 is disposed. In the version shown in FIG. 23, the frame portion 412d merges with an upper frame portion 412b. As the lower frame portion 412a extends forwardly beyond the frame portion 412d, the frame portion 412a extends upward toward the front extendable handle assembly 436.

Figure 24:
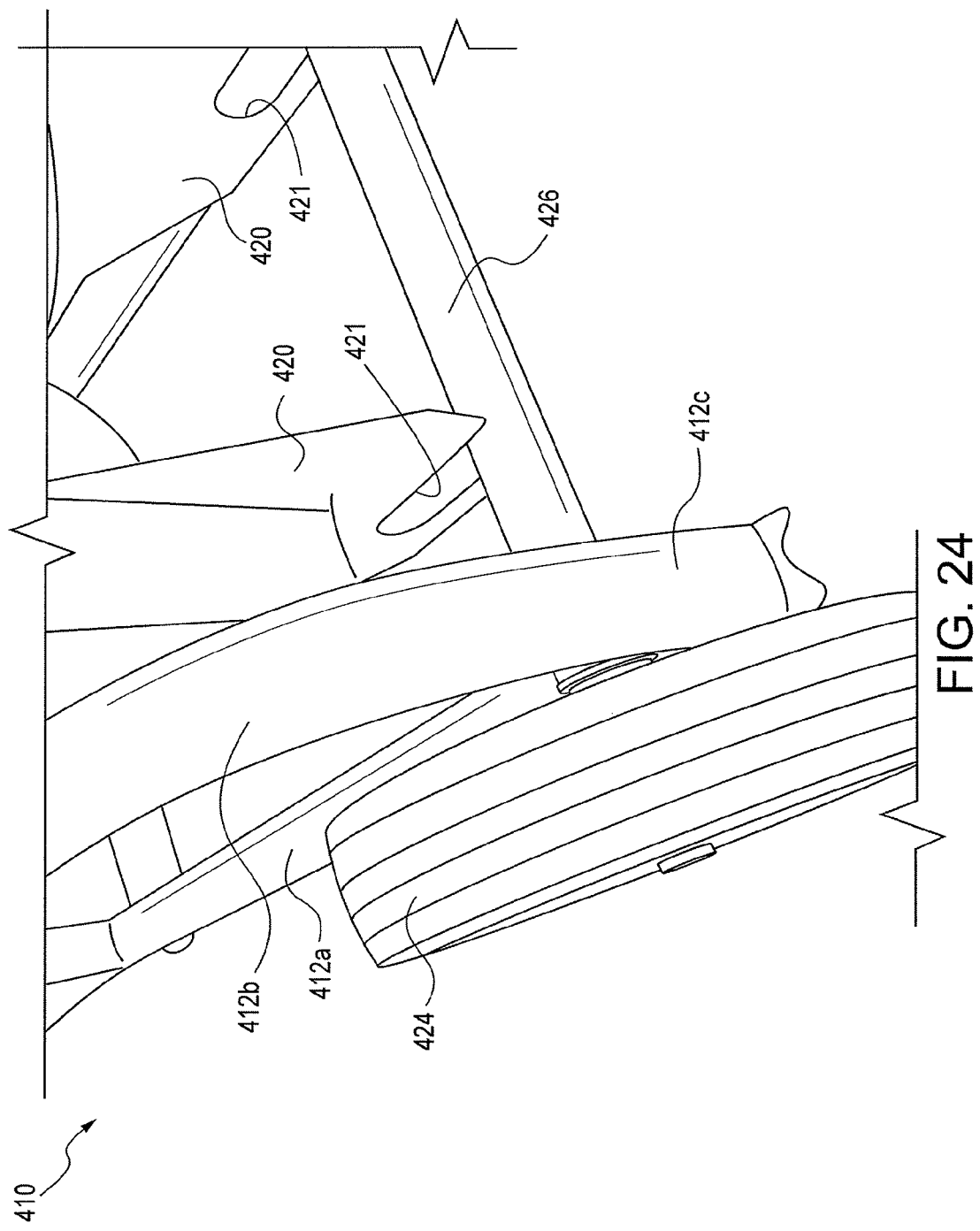
FIG. 24 is a detailed view of a wheel and axle portion of the preferred embodiment threading machine of FIG. 13.

FIG. 24 is a detailed view of a wheel 424 and corner portion of the frame 412 of the preferred embodiment threading machine 410. In certain versions, one or more central support members 420 defining support slots 421 can be provided. The support members 420 extend downward from the body 418 (FIG. 19) and/or an upper portion of the frame 412. The support slots 421 are sized and positioned to receive the axle housing 426. A rearward portion 412c of the frame engages or is affixed to the lower frame portion 412a. The rearward portion 412c merges with the upper frame portion 412b. The axle housing 426 is generally affixed to the frame 412 at one or both frame portions 412c and/or 412a.

Figure 25:
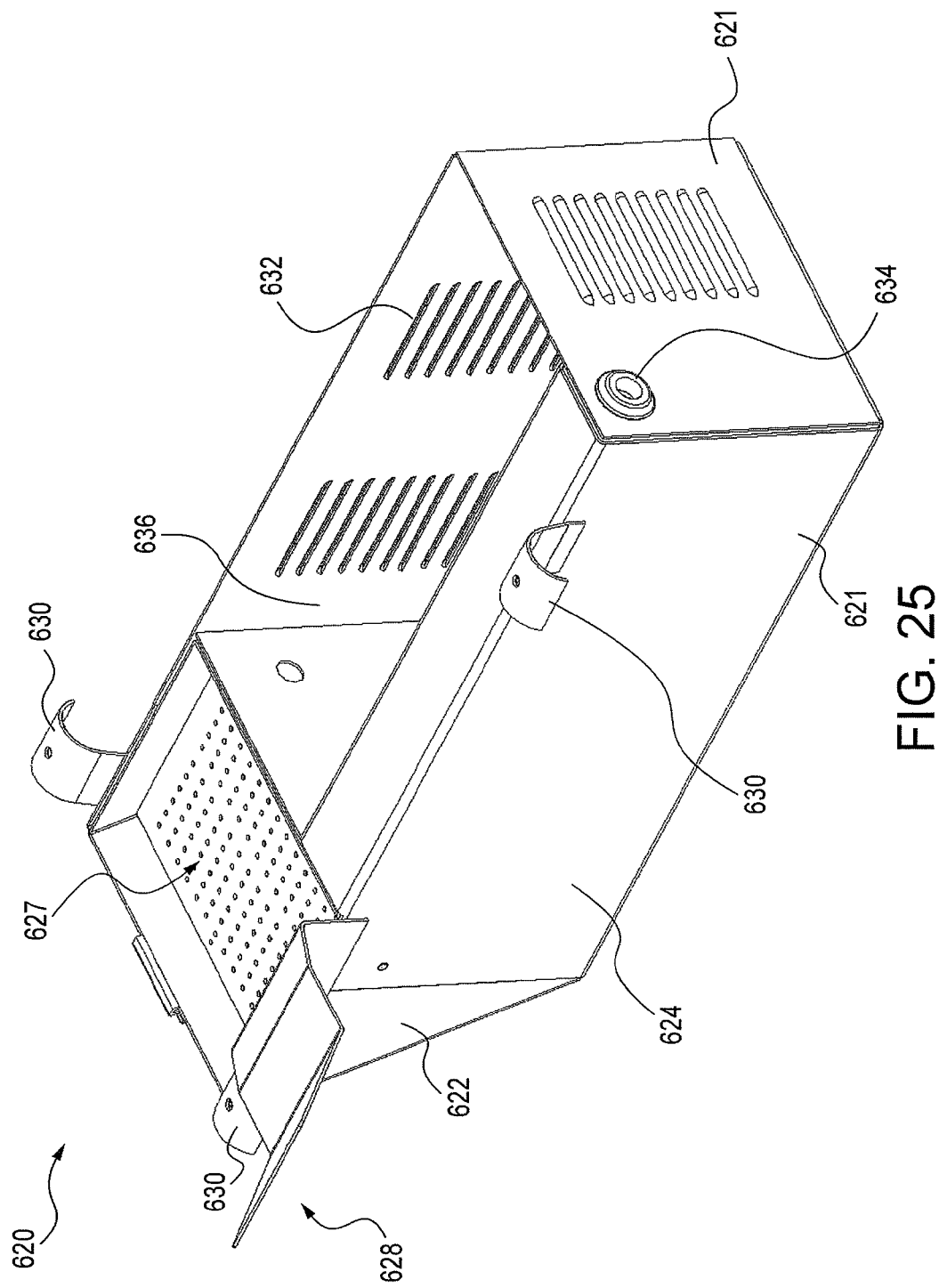
FIG. 25 is a perspective view of an alternate configuration for a preferred embodiment sump tray assembly in accordance with the present subject matter.
Figure 26:
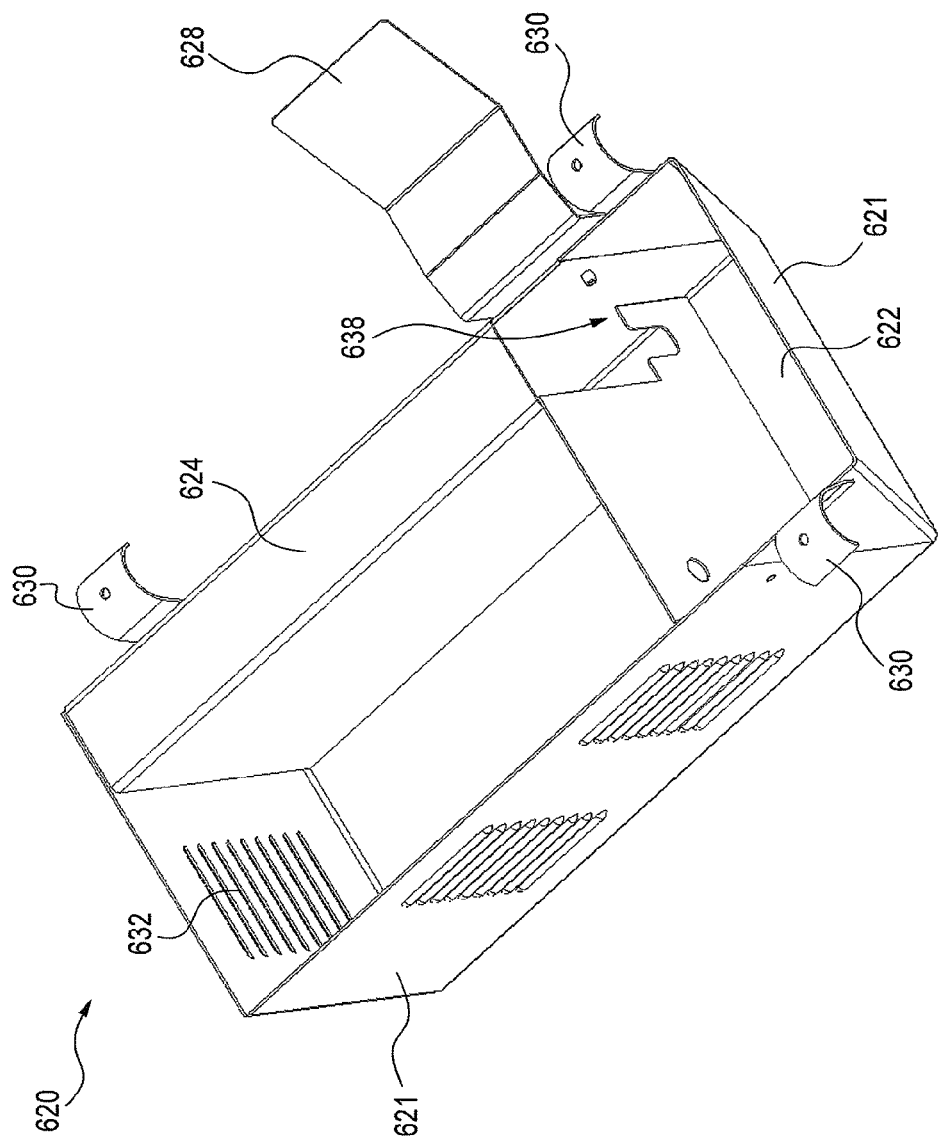
FIG. 26 is another perspective view of the sump tray assembly of FIG. 25 in which a chip tray is removed.

FIGS. 25 and 26 illustrate another preferred sump assembly 620 in accordance with the present subject matter. The sump assembly 620 comprises a main sump portion 622, one or more transport sump portions 624, and one or more baffles 638 generally disposed between the main sump portion 622 and the transport sump portion(s) 624. The main sump portion 622 includes a generally open top face within which a chip tray 627 is releasably engaged. One or more oil drip guards 628 may be included in the sump assembly 620 and which generally extend outward at an inclined angle to catch and direct oil dripped onto the guard 628 from above, into the main sump portion 622 through the chip tray 627. The sump assembly 620 also preferably comprises one or more mounting tabs 630 which can be in the form of outwardly extending curved projections that engage portions of frame members or other regions or components of a threading machine for supporting the sump assembly 620. The enclosure of the sump assembly 620 or rather walls 621 of the enclosure define an interior compartment 636 sized to receive a motor such as the previously described motor 100 of the threading machine 10 or the motor 500 of the machine 410, for example. Preferably, the interior compartment 636 is defined alongside at least one of the main sump portion 622 and the transport sump portion(s) 624, and preferably alongside both portions as shown in FIGS. 25 and 26. The remaining walls defining the interior compartment 636 preferably include a collection of vents 632 for promoting air flow within the compartment 636. The sump assembly 620 also preferably includes a drain plug 634 along a wall of the transport sump portion(s) such as 624, which is oppositely located from the main sump portion 622.

Figure 27:
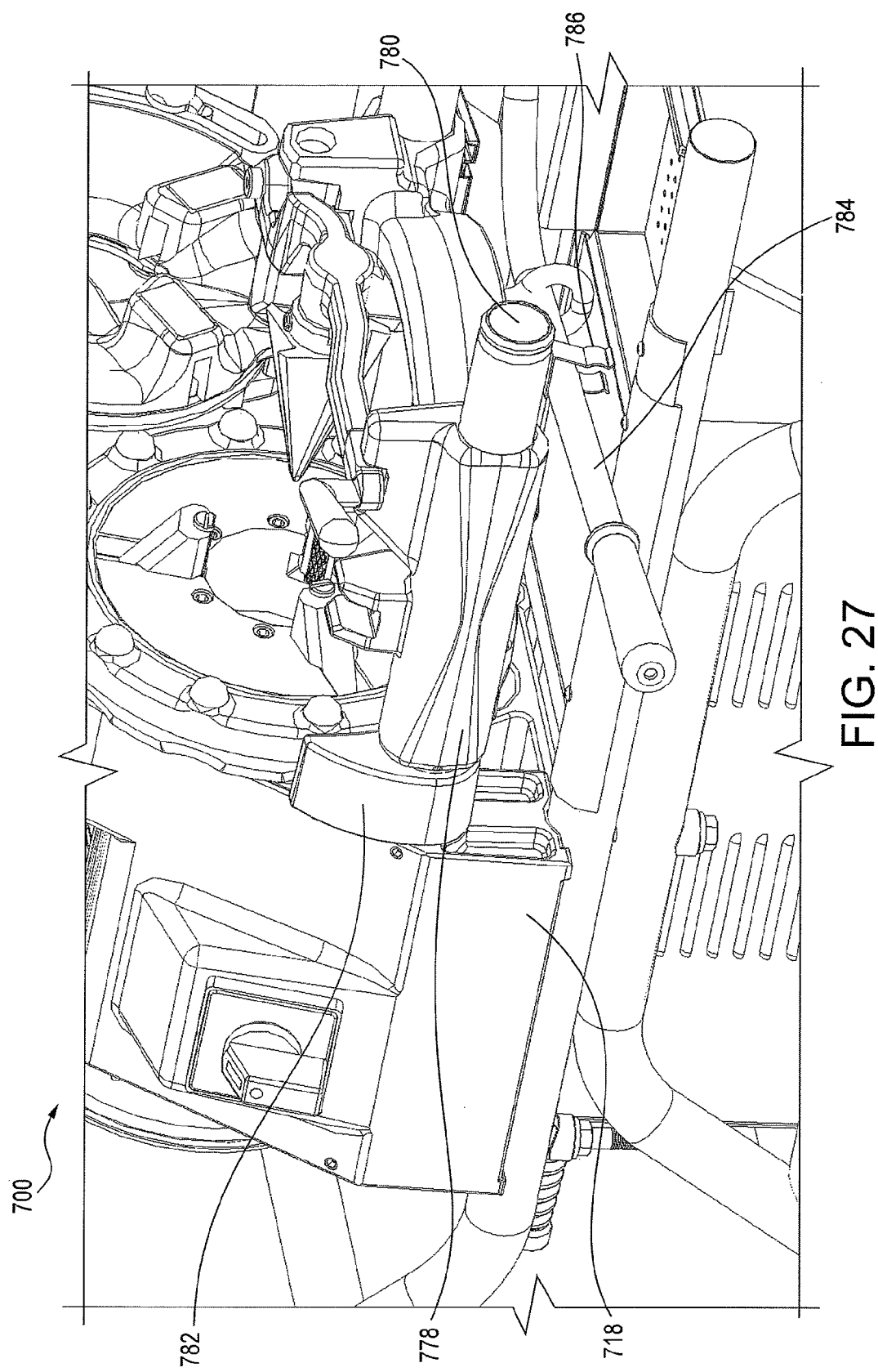
FIG. 27 is a detailed view of a bumper and lever clamp assembly in accordance with the present subject matter.

FIG. 27 illustrates a bumper and lever clamp assembly 700 in accordance with the present subject matter. The bumper and/or lever clamp assembly 700 can be incorporated in any of the threading machines or devices described herein. The bumper and lever clamp assembly 700 comprises a bumper 782 which is affixed or otherwise secured to one or more carriage rails 780, and particularly between a body 718 or housing portion of the threading machine and a carriage 778 slidably disposed on the carriage rails 780. The one or more bumper(s) 782 are formed from a deformable and/or compressible material such as a rubber or polymeric estomeric material. The bumper(s) 782 serve to prevent contact between the carriage 782 and the body 718 such as when inclining the threading machine during transport or storage. The bumper(s) 782 also serve to absorb impact or shock in the event that the carriage, slidably disposed on the carriage rails 780, inadvertently slides toward the body 718. As previously noted, the body 718 can be formed from a wide array of materials including cast metals.

The bumper and lever clamp assembly 700 also comprises a lever clamp assembly which retains a lever 784 in a desired stowed position. The lever 784 is used for selectively retaining the carriage 778 in a desired position along the rails 780. The lever clamp assembly includes a clamping clip 786 which is secured to the threading machine such as secured to a carriage rail 780 or other suitable member. The clamping clip 786 is preferably formed from a resilient metal such as spring steel or other similar flexible metal. The clamping clip 786 is sized and configured to releasably engage the lever 784.

FIGS. 28-31 illustrate another preferred embodiment threading machine 810 in accordance with the present subject matter. In this version, the threading machine is free of wheels. Instead, one or more feet or downwardly extending legs are provided on the frame. Specifically, the machine 810 comprises a tube frame 812 that includes four legs 816 having feet 814 disposed at the distal ends of the legs 816. The machine 810 is free of any wheels such as wheels 24 used in the previously described threading machine 10 of FIGS. 1-11. The machine 810 also comprises a body 818 and various implements depicted in FIG. 29 such as a cutter 860, a die head 866, and a reamer 872 as previously described in association with the machine 10 of FIGS. 1-11. The threading machine 810 also comprises a rearwardly extending handle 838 which also serves as a storage support. The machine 810 includes one or more switches 896 to control operation of the machine 810 and specifically a motor (not shown). The threading machine 810 also comprises a carriage 878 and associated carriage lever 884 for releasably securing the carriage 878 and/or components associated therewith. The threading machine 810 also comprises a sump assembly 920 best shown in FIGS. 30 and 31 similar to the previously described sump assembly 620 of FIGS. 25 and 26. The sump assembly 920 includes a housing 921 defining a forwardly disposed main sump portion 922 and one or more transport or storage sump portion(s) 924. A removable chip tray 927 is provided which is disposed over an open upwardly directed face of the main sump portion 922. The sump assembly 920 also comprises an oil drip guard 928 (also shown in FIG. 28) which extends laterally outward and upward from the main sump portion 922.

Figure 28:
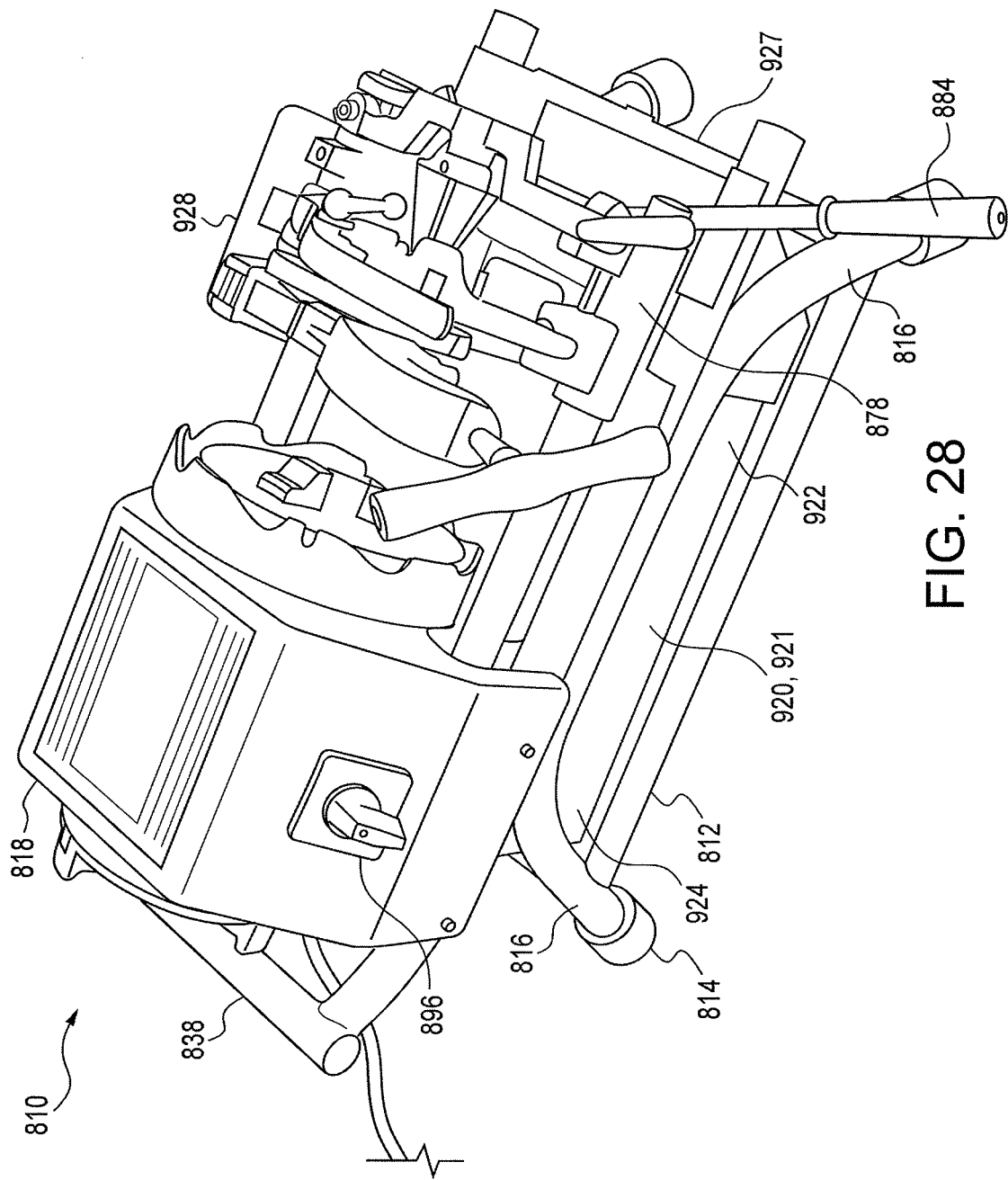
FIG. 28 is a perspective view of another preferred embodiment threading machine in accordance with the present subject matter.
Figure 29:
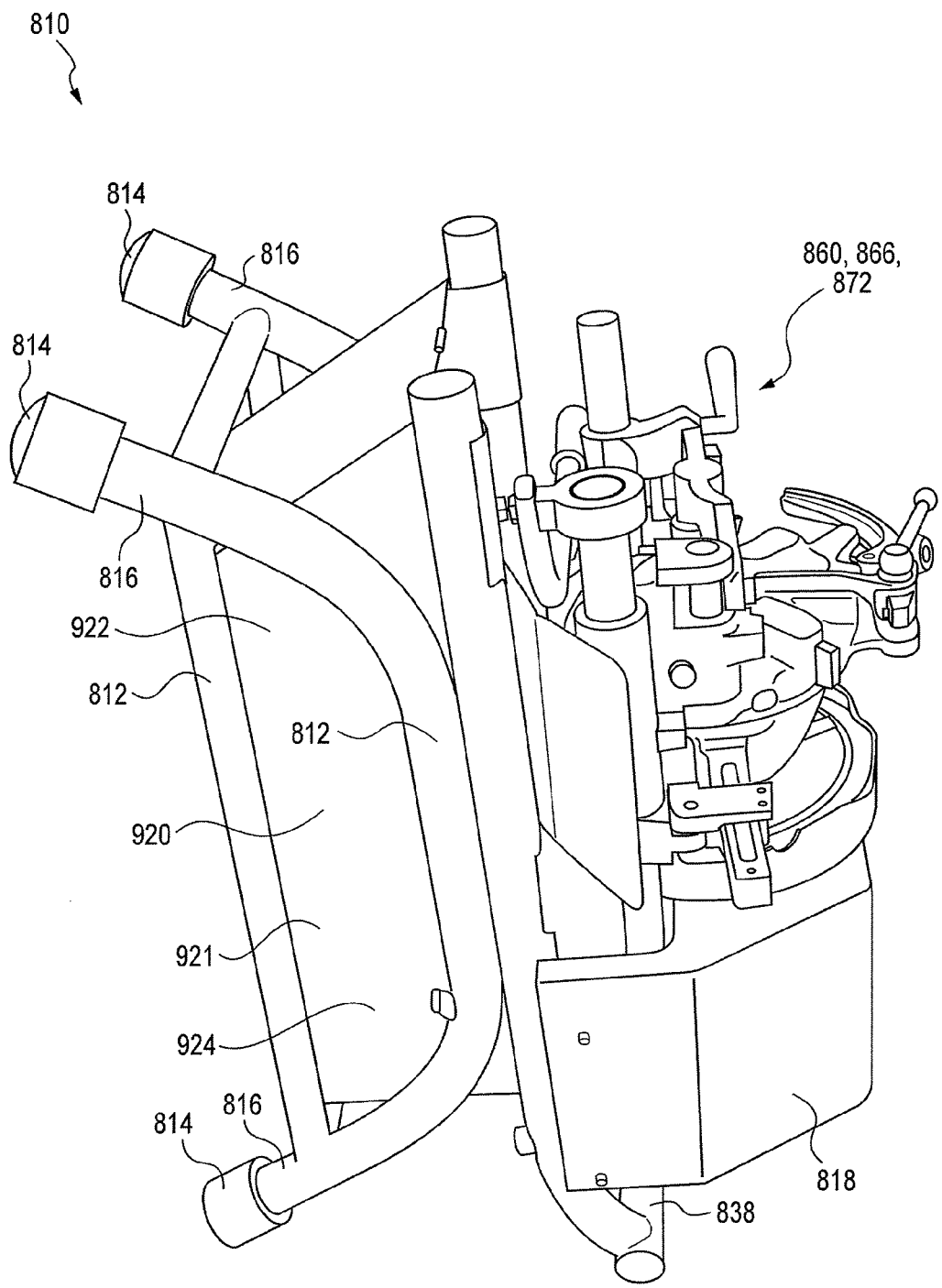
FIG. 29 is a perspective view of the preferred embodiment threading machine of FIG. 28 in a storage position.
Figure 30:
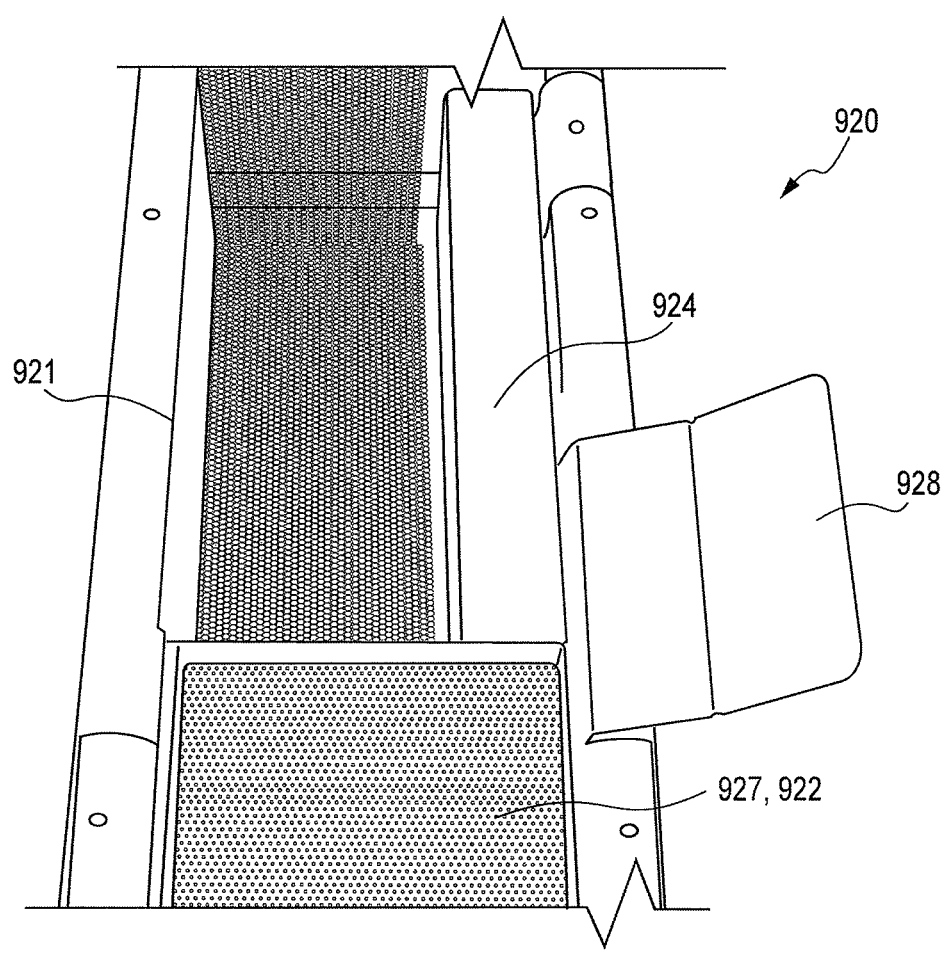
FIG. 30 is a detailed view of a portion of a sump tray assembly of the preferred embodiment threading machine of FIG. 28.
Figure 31:
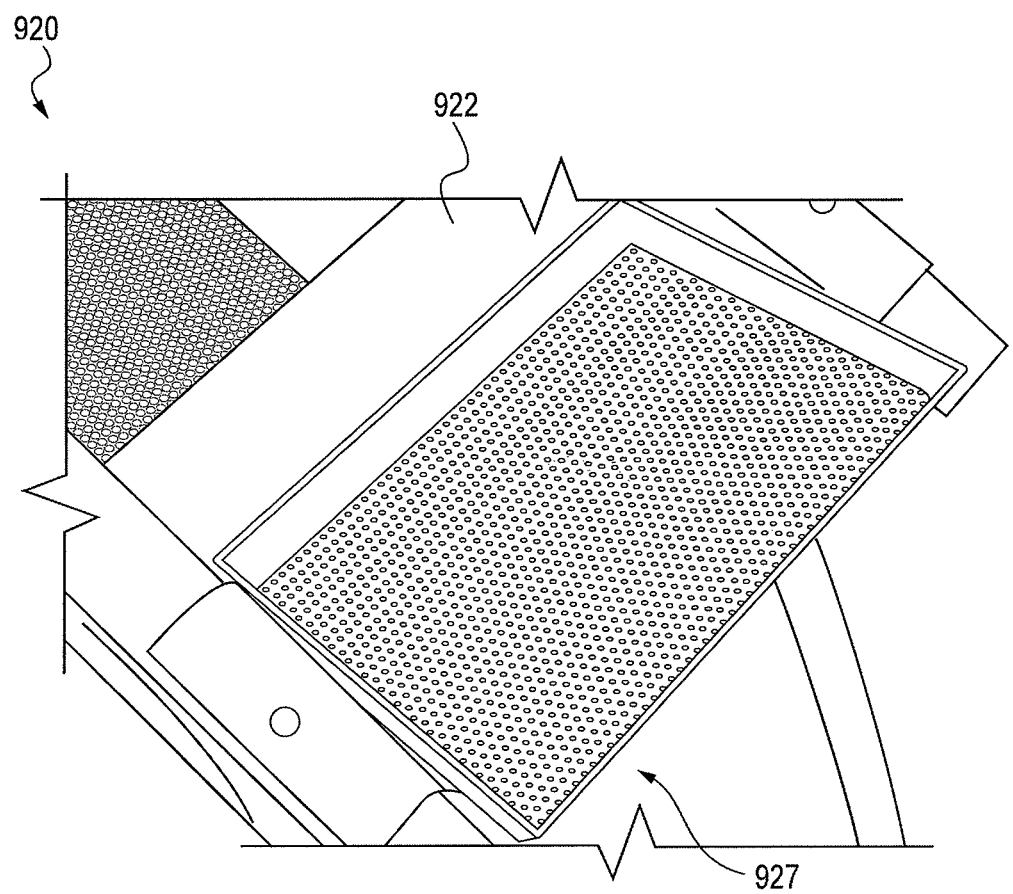
FIG. 31 is a detailed view of a removable chip tray of the sump tray assembly of the preferred embodiment threading machine of FIG. 28.

The threading machine 810 is configured to be readily positionable between an operating or use state as depicted in FIG. 28 and a storage position as shown in FIG. 29. As previously described in association with the threading machine 10 of FIGS. 1-11, the machine 810 includes a rearwardly extending handle 838 which includes or serves as a stop that contacts the floor when the machine 810 is oriented to its storage position as shown in FIG. 29. The transport or storage sump portion(s) 924 of the sump assembly 920 serve to collect and retain the cutting oil which thus flows into the portion(s) as a result of orienting the machine 810 to the storage position.

Figure 32:
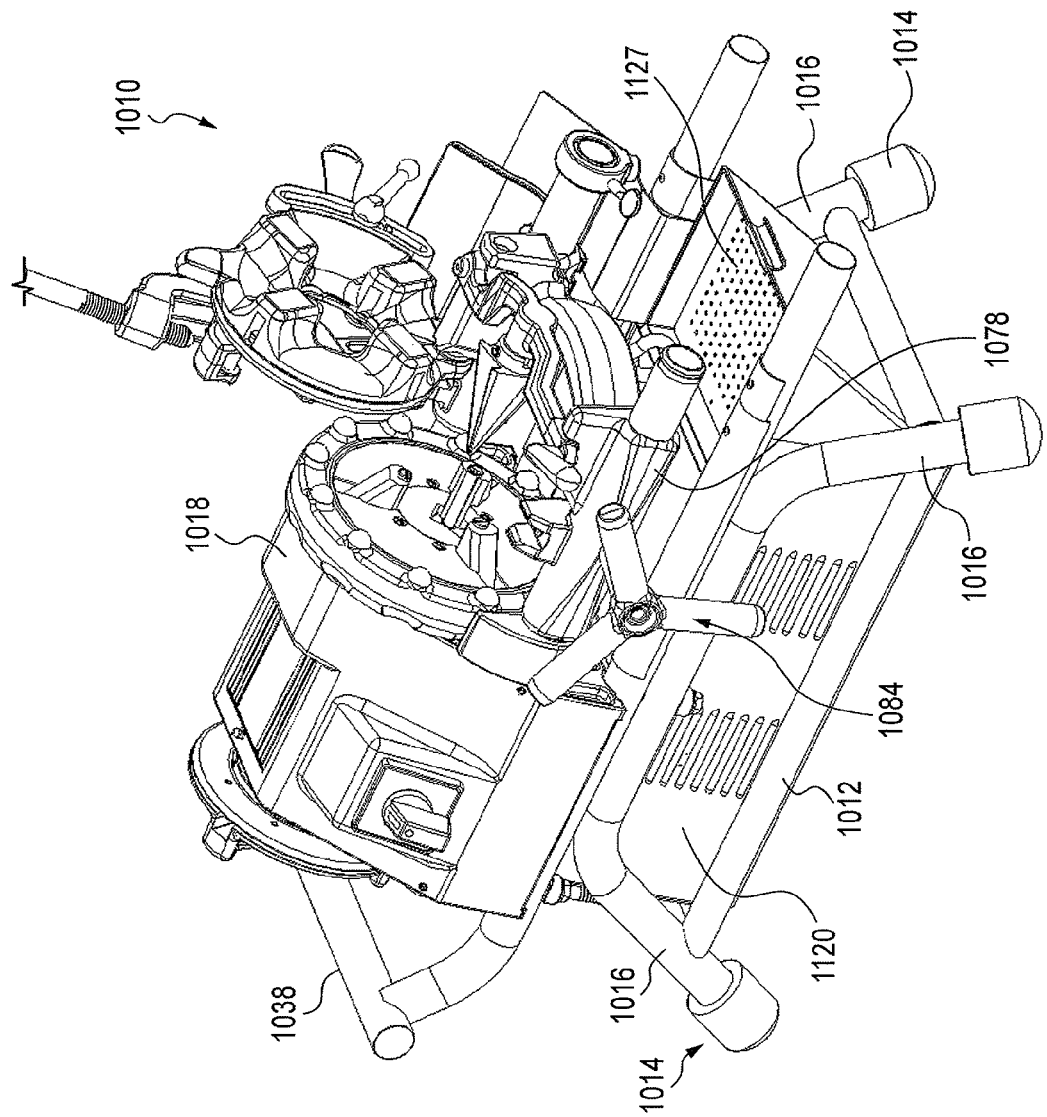
FIG. 32 is a detailed view of another preferred embodiment threading machine in accordance with the present subject matter.

FIG. 32 illustrates another preferred embodiment threading machine 1010 in accordance with the present subject matter. In this version, the threading machine 1010 comprises a hand wheel 1084 for securing a carriage 1078 and/or associated carriage components to a desired position and/or to the frame or other component of the threading machine 1010. The threading machine 1010 comprises a tube frame 1012 having a plurality of legs 1016 with distally located feet 1014. The threading machine 1010 also comprises a body 1018, a rearwardly extending handle 1038, and a sump assembly 1120 as previously described herein with a removable chip tray 1127.

Figure 33:
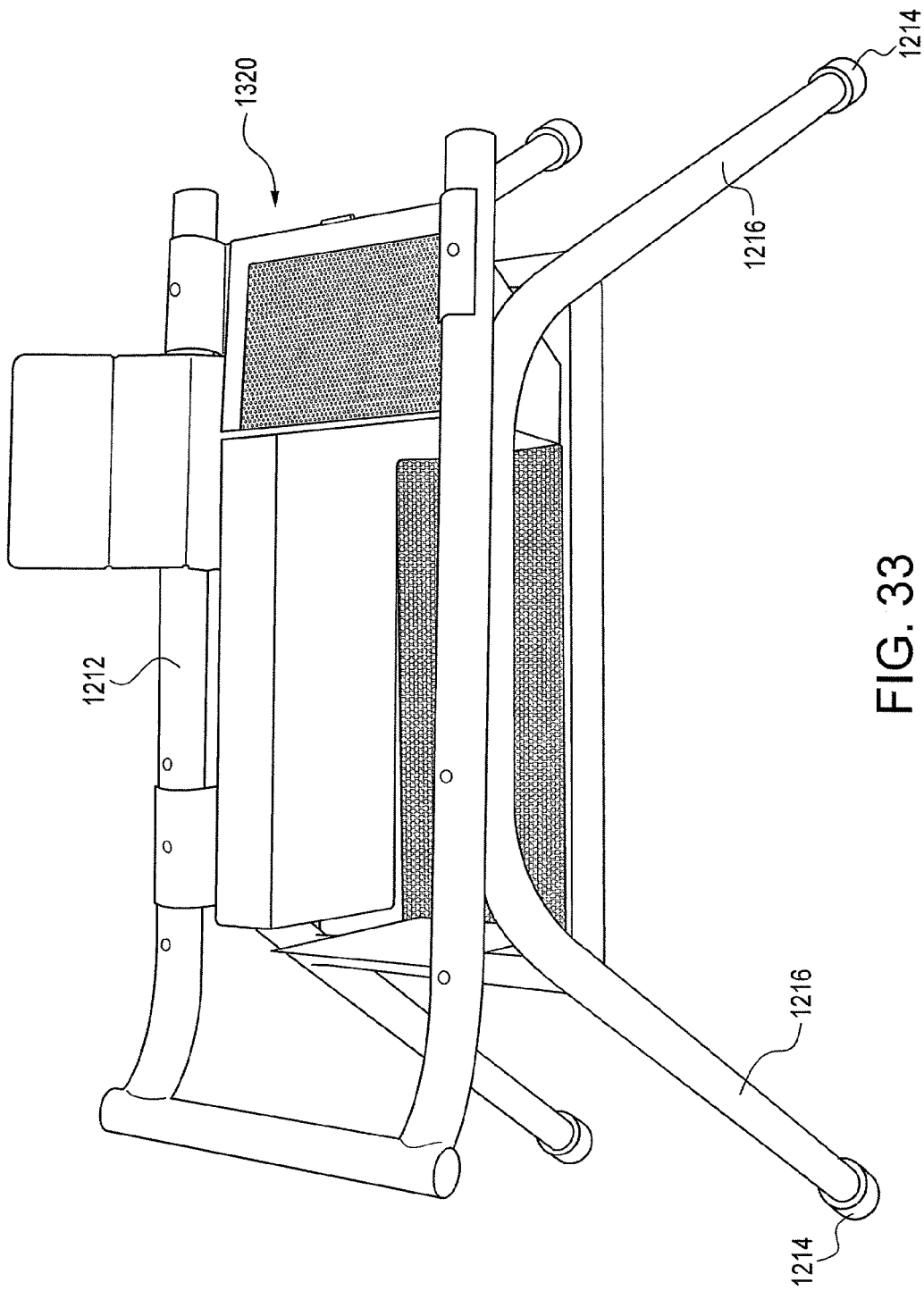
FIG. 33 is a perspective view of a frame and extendable leg extensions of the preferred embodiment threading machine of FIG. 32.
Figure 35:
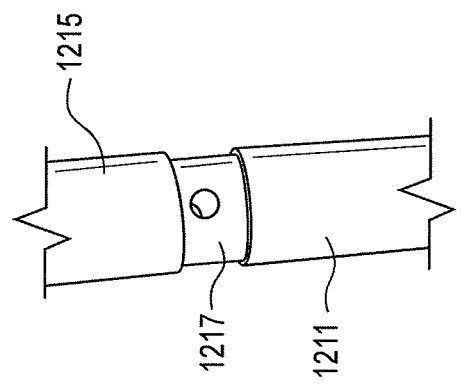
FIG. 35 is a detailed view illustrating engagement of a leg extension with the preferred embodiment threading machine of FIG. 32.
Figure 34:
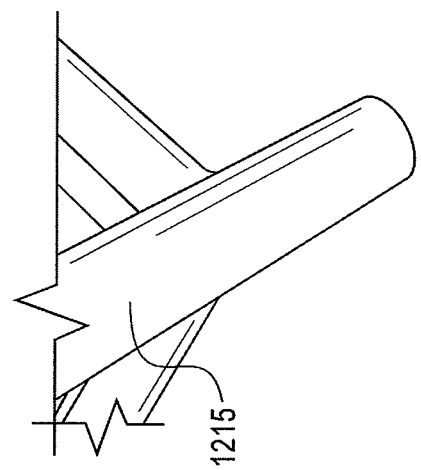
FIG. 34 is a detailed view of a leg end of the preferred embodiment threading machine of FIG. 32.
Figure 37:
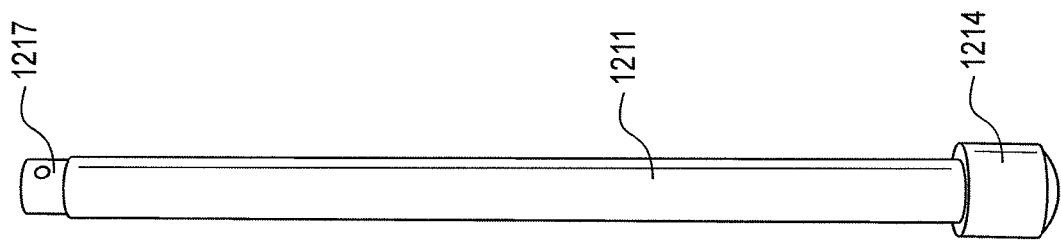
FIG. 37 is a view of a leg extension for use with the preferred embodiment threading machine of FIG. 32.
Figure 36:
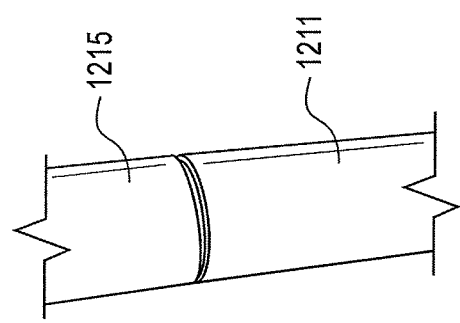
FIG. 36 is a detailed view of a leg extension engaged with a leg of the preferred embodiment threading machine of FIG. 32.

The versions of the threading machines which are free of wheels and thus, which include a plurality of legs, can also include one or more leg extensions to selectively raise the height or elevation of the machine. FIG. 33 illustrates a tube frame 1212 having a collection of extended legs 1216, with each leg including a distally located foot 1214. The tube frame 1212 is typically sized and configured to receive and support a sump assembly 1320 similar to the previously described sump assembly 620 of FIGS. 25 and 26. The legs of the tube frame 1212 can be extended in length from an unextended length such as for example as shown in FIG. 28 or 29, to the extended length as shown in FIG. 33. The process of extension is typically performed by removing the feet 1214 from the ends of unextended legs 1215 as shown in FIG. 34. Then, extension couplers 1217 are inserted into a distal end of the unextended legs 1215, and also into an end of a leg extension 1211 as illustrated in FIG. 35. The extension couplers 1217 typically have a smaller diameter than the inside diameter of the unextended legs 1215 and the leg extensions 1211, and particularly are sized to fittingly engage within those components. The leg 1215 and leg extension 1211 are then urged toward one another as shown in FIG. 36. The feet 1214 are attached to the distal ends of the leg extensions 1211. Alternatively, the leg extensions are provided with or formed with the extension couplers 1217 and/or the feet 1214, as depicted in FIG. 37.

Figure 38:
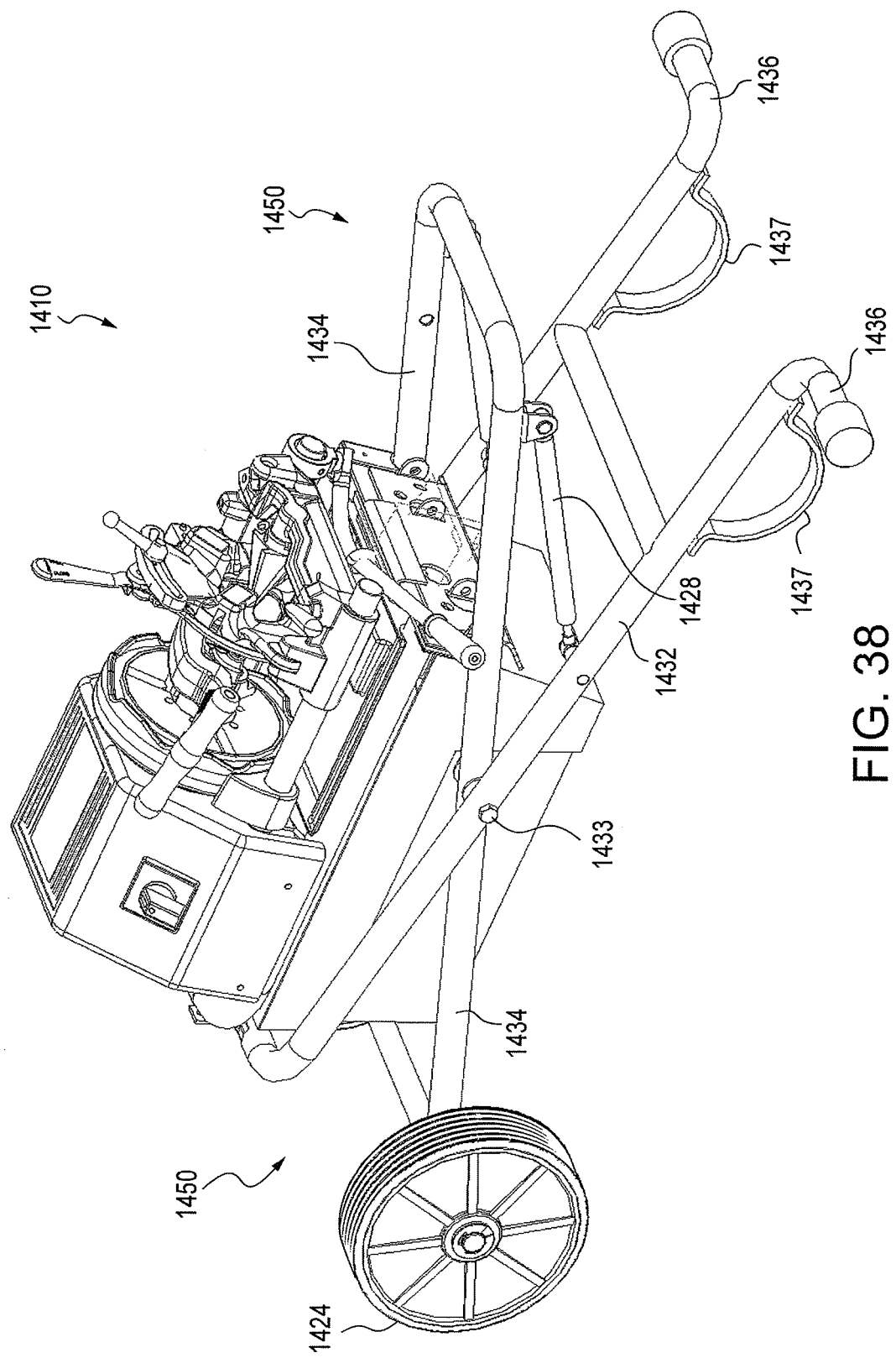
FIG. 38 is a perspective view of another preferred embodiment threading machine having an adjustable height frame in accordance with the present subject matter.

FIG. 38 illustrates another preferred embodiment threading machine 1410 in accordance with the present subject matter. The threading machine 1410 comprises a threading machine assembly as generally previously described herein which is supported on an extendable hinged frame assembly shown as 1450. The extendable hinged frame assembly 1450 comprises a pair of wheels 1424 disposed at a rearward end of the machine 1410, and one or more handles 1436 located at a frontward region of the machine 1410. The frame assembly includes a pair of interengaging frame members 1432 and 1434 which are pivotally connected to one another via a pivot assembly 1433. The handles 1436 are defined along an end region of one of the frame members, such as for example the frame member 1432. One or more feet or support members 1437 are optionally provided proximate to the handles 1436. Preferably, one or more biasing members 1428 are provided which extend between the frame members 1432 and 1434. A latching assembly (not shown) is used to secure the frame members 1432 and 1434 in a desired position relative to one another. Alternatively or in addition, the biasing members 1428 can include securing or locking members to affix or retain the frame members 1432 and 1434 in a desired position. It will be appreciated that the extendable hinged frame assembly 1450 is merely one example of an extendable frame assembly which could be used. That is, the present subject matter includes a wide array of frame assemblies that enable selective extension and/or positioning by an operator. Additional details and aspects of the frame assembly are provided by reference to a commercially available stand for Rigid Tool Company under the designation RIDGID Model 250 Stand.

In many of the one preferred embodiments, the threading machine comprises a steel tube frame to support the components of the machine. The bottom of the frame is equipped with rubber feet to prevent sliding during use on the floor. Wheels are rotably engaged at the rear of the assembly to allow the unit to be rolled. A front handle of the unit extends from the tube frame and latches into position at a height designed for transport. The same handle is used to place the unit in a storage position. An oil sump with a transport sump compartment prevents the oil from spilling during transport. A stop, bumper, and/or lever latching mechanism are used to fix the carriage for transport and storage. The other machine components include a cast body to support the rails and spindle of the machine, a carriage which slides on the rails and supports the threading tools, for example, cutter, reamer, and die head, a lever to move the carriage on the rails, a front and rear chuck to grip the pipe in the spindle, an induction motor with gear reductions to drive the machine spindle, a switch to control the induction motor, a linecord to connect the device to a power supply, a pump connected to the motor to circulate cutting oil, and a bottom cover and sump to cover the internals and hold the thread cutting oil.

An alternative embodiment includes the same machine components as the previously described preferred embodiments; however, a universal or series motor is used instead of an induction motor.

Another alternative embodiment includes the same machine components as the previously described preferred embodiments; however, the extendable handle is fixed in one position and integrated into the steel tubing frame.

Another alternate embodiment includes the same machine components as the previously described preferred embodiments; however, a steel tube frame is used to support the components at a waist high level such as about 30 inches (76.2 cm) relative to a standing operator. Specifically the elevating provisions are configured to raise the machine to a height such that a workpiece when retained within the machine is at a height of about 30 inches from the floor. As previously noted, the stand may be configured similar to the RIDGID model 250 threading machine stand commercially available from Ridge Tool Company of Elyria, Ohio. The stand may be adjustable in height to adapt to the appropriate height for the user.

In certain versions of the machines, components can be used to support the machine at waist high levels. For example, the previously described leg extensions can be utilized for this purpose, as shown in FIGS. 34-37.

As previously explained herein, the advantages of the preferred embodiment compact and portable threading machines with tubular frames include a reduction in cost, optimization for use on the floor, increased portability, reduced storage space, and design flexibility.

Many other benefits will no doubt become apparent from future application and development of this technology.

All patents, applications, and articles noted herein are hereby incorporated by reference in their entirety.

Moreover, the present subject matter includes machines or units having nearly any combination of features and/or aspects described herein. Furthermore, the present subject matter includes the use of additional components in combination with the preferred embodiment devices, or the devices without one or more described components.

As described hereinabove, the present subject matter addresses several problems associated with previously known devices. However, it will be appreciated that various changes in the details, materials and arrangements of parts, which have been herein described and illustrated in order to explain the nature of the subject matter, may be made by those skilled in the art without departing from the principle and scope of the subject matter, as expressed in the appended claims.

What is claimed is:

1. A compact portable threading machine comprising:
 a frame defining a front portion and a rear portion;
 a powered assembly for rotating a workpiece, the powered assembly including (i) an electric motor; (ii) holding provisions to hold a workpiece, and (iii) a drive assembly for transferring rotary power from the motor to the holding provisions, the powered assembly being supported by the frame;
 one or more wheels rotatably engaged proximate the rear portion of the frame;
 a handle assembly secured to the front portion of the frame;
 an oil sump for retaining cutting oil and including a transport sump compartment;
 wherein the machine is positionable between (i) an operational position and (ii) an inclined storage position in which the storage angle of the machine is within a range of from 89° to 70°;
 wherein the handle assembly includes provisions for extending the handle outward from the front portion of the frame and the handle can be selectively extended to a desired position and includes a latching assembly to retain the handle in the desired position.

2. The compact portable threading machine of claim 1 wherein the machine is further positionable to an inclined transport position.

3. The compact portable threading machine of claim 1 wherein the wheels are engaged to the frame such that when the machine is in an operational position the wheels do not contact a floor or work surface.

4. The compact portable threading machine of claim 2 wherein when the machine is in either the storage position or the transport position, the wheels contact the floor or work surface.

5. The compact portable threading machine of claim 1 further comprising:
 at least one tool supported on a slidable carriage assembly which is supported on the frame.

6. The compact portable threading machine of claim 5 further comprising:

a retaining assembly for securing at least one of the slidable carriage assembly and the at least one tool and thereby preventing movement of at least one of the carriage assembly and the tool.

7. The compact portable threading machine of claim 1 wherein the electric motor is an induction motor.

8. A compact portable threading machine positionable between an operational position and an inclined transport position, the machine comprising:
   a frame defining a front portion and a rear portion;
   a powered assembly for rotating a workpiece, the powered assembly including (i) an electric motor, (ii) holding provisions to hold a workpiece, and (iii) a drive assembly for transferring rotary power from the motor to the holding provisions;
   an oil sump assembly for retaining cutting oil and including a main sump compartment which retains at least a portion of the cutting oil when the machine is in the operational position, and at least one transport sump compartment which retains substantially all of the cutting oil when the machine is in the transport position;
   wherein the frame includes provisions for selectively adjusting a height of the machine and maintaining a selected height.

9. The compact portable threading machine of claim 1 wherein the electric motor is a universal or series motor.

10. The compact portable threading machine of claim 1 wherein the handle is stationary relative to the frame.

11. The compact portable threading machine of claim 1 wherein the frame is configured to selectively elevate a workpiece when held by the holding provisions to a height of at least about 30 inches (76.2 cm).

12. The compact portable threading machine of claim 1 wherein the frame includes provisions for selectively adjusting a height of the machine and maintaining a selected height.

13. The compact portable threading machine of claim 1 further comprising:
   rubber feet on the frame and positioned to contact a floor or work surface when the machine is in an operational position.

14. The compact portable threading machine of claim 1 wherein the one or more wheels includes a pair of wheels.

15. The compact portable threading machine of claim 1 further comprising:
   one or more wheels rotatably engaged proximate the front portion of the frame.

16. The compact portable threading machine of claim 15 wherein the one or more wheels rotatably engaged proximate the front portion of the frame are universal wheels.

17. The compact portable threading machine of claim 1 further comprising:
   a slidable carriage supported on the threading machine;
   a rubber stop or bumper positioned on the threading machine to prevent contact between the slidable carriage and another component rearward of the slidable carriage.

18. The compact portable threading machine of claim 1 wherein the frame includes a plurality of tubular members.

19. A compact portable threading machine positionable between an operational position and an inclined transport position, the machine comprising:
   a frame defining a front portion and a rear portion;
   a powered assembly for rotating a workpiece, the powered assembly including (i) an electric motor, (ii) holding provisions to hold a workpiece, and (iii) a drive assembly for transferring rotary power from the motor to the holding provisions;
   an oil sump for retaining cutting oil and including at least one sump compartment;
   at least one wheel rotatably engaged to the frame;
   wherein the at least one wheel is engaged to the frame such that when the machine is in an operational position, the at least one wheel is free from contact with a floor;
   a handle assembly secured to the frame, wherein the handle assembly includes provisions for extending the handle outward from the front portion of the frame.

20. The compact portable threading machine of claim 19 wherein the at least one wheel is in contact with the floor when the threading machine is in the inclined transport position.

21. The compact portable threading machine of claim 19 wherein the machine is further positionable to an inclined storage position.

22. The compact portable threading machine of claim 19 wherein the handle can be selectively extended to a desired position and includes a latching assembly to retain the handle in the desired position.

23. The compact portable threading machine of claim 19 further comprising:
   at least one tool supported on a slidable carriage assembly which is supported on the frame.

24. The compact portable threading machine of claim 23 further comprising:
   a retaining assembly for securing at least one of the slidable carriage assembly and the at least one tool and thereby preventing movement of the carriage assembly and the at least one tool.

25. The compact portable threading machine of claim 19 wherein the electric motor is an induction motor.

26. The compact portable threading machine of claim 19 wherein the electric motor is a universal or series motor.

27. The compact portable threading machine of claim 19 wherein the frame includes provisions for selectively adjusting a height of the machine and maintaining a selected height.

28. The compact portable threading machine of claim 19 further comprising:
   rubber feet on the frame and positioned to contact a floor or work surface when the machine is in an operational position.

29. The compact portable threading machine of claim 19 wherein the at least one wheel includes a pair of wheels.

30. The compact portable threading machine of claim 19 further comprising:
   a slidable carriage supported on the threading machine;
   a rubber stop or bumper positioned on the threading machine to prevent contact between the slidable carriage and another component rearward of the slidable carriage.

31. The compact portable threading machine of claim 19 wherein the frame includes a plurality of tubular members.

32. A compact portable threading machine positionable between an operational position and an inclined transport position, the machine comprising:
   a frame defining a front portion and a rear portion;
   a powered assembly for rotating a workpiece, the powered assembly including (i) an electric motor, (ii) holding provisions to hold a workpiece, and (iii) a drive assembly for transferring rotary power from the motor to the holding provisions;
   an oil sump assembly for retaining cutting oil and including a main sump compartment which retains at least a portion of the cutting oil when the machine is in the operational position, and at least one transport sump compartment which retains substantially all of the cutting oil when the machine is in the transport position;
at least one tool supported on a slidable carriage assembly which is supported on the frame; and
a retaining assembly for securing the slidable carriage assembly and the at least one tool and thereby preventing movement of the carriage assembly and the at least one tool.

33. The compact portable threading machine of claim 32 wherein the oil sump assembly comprises at least one baffle disposed between the main sump compartment and the at least one transport sump compartment.

34. The compact portable threading machine of claim 32 wherein the electric motor is disposed immediately adjacent to at least one of (i) the main sump compartment and (ii) the at least one transport sump compartment.

35. The compact portable threading machine of claim 32 further comprising:
one or more wheels rotatably engaged to the frame.

36. The compact portable threading machine of claim 35 wherein the one or more wheels are engaged to the frame such that when the machine is in the operational position the one or more wheels do not contact the floor.

37. The compact portable threading machine of claim 36 wherein the one or more wheels are engaged to the frame such that when the machine is in the transport position, the wheels contact the floor.

38. The compact portable threading machine of claim 32 wherein the machine is further positionable to an inclined storage position.

39. The compact portable threading machine of claim 38 wherein the one or more wheels are engaged to the frame such that when the machine is in the storage position, the wheels contact the floor.

40. The compact portable threading machine of claim 32 further comprising:
a handle assembly secured to the front portion of the frame.

41. The compact portable threading machine of claim 40 wherein the handle assembly includes provisions for extending the handle outward from the front portion of the frame.

42. The compact portable threading machine of claim 41 wherein the handle can be selectively extended to a desired position and includes a latching assembly to retain the handle in the desired position.

43. The compact portable threading machine of claim 32 wherein the electric motor is an induction motor.

44. The compact portable threading machine of claim 32 wherein the electric motor is a universal or series motor.

45. The compact portable threading machine of claim 32 wherein the frame includes provisions for selectively adjusting a height of the machine and maintaining a selected height.

46. The compact portable threading machine of claim 32 further comprising:
rubber feet on the frame and positioned to contact a floor or work surface when the machine is in an operational position.

47. The compact portable threading machine of claim 32 further comprising:
a slidable carriage supported on the threading machine;
a rubber stop or bumper positioned on the threading machine to prevent contact between the slidable carriage and another component rearward of the slidable carriage.

48. The compact portable threading machine of claim 32 wherein the frame is an extendable frame assembly including a first frame section and a pivotally attached second frame section, the first frame section including a pair of wheels and the second frame section including a pair of handles.

49. A compact portable threading machine comprising:
an extendable frame assembly including a first frame section and a pivotally attached second frame section, the first frame section including a pair of wheels and the second frame section including a pair of handles;
a powered assembly for rotating a workpiece, the powered assembly including (i) an electric motor, (ii) holding provisions for holding a workpiece, and (iii) a drive assembly for transferring rotary power from the motor to the holding provisions, the powered assembly supported by the extendable frame assembly;
an oil sump for retaining cutting oil and including a main sump compartment and at least one transport sump compartment;
wherein the machine is positionable between (i) an operational position and (ii) an inclined transport position;
a slidable carriage supported on the threading machine;
a rubber stop or bumper positioned on the threading machine to prevent contact between the slidable carriage and another component rearward of the slidable carriage.

50. The compact portable threading machine of claim 49 wherein the frame assembly can be selectively extended to a desired position and includes a latching assembly to retain the frame assembly in the desired position.

51. The compact portable threading machine of claim 49 further comprising:
at least one tool supported on a slidable carriage assembly which is supported on the frame assembly.

52. The compact portable threading machine of claim 51 further comprising:
a retaining assembly for securing the slidable carriage assembly and the at least one tool and thereby preventing movement of the carriage assembly and the at least one tool.

53. The compact portable threading machine of claim 49 wherein the electric motor is an induction motor.

54. The compact portable threading machine of claim 49 wherein the electric motor is a universal or series motor.

55. The compact portable threading machine of claim 49 wherein the frame includes a plurality of tubular members.

56. A compact portable threading machine positionable between an operational position and an inclined transport position, the machine comprising:
a frame defining a front portion and a rear portion;
a powered assembly for rotating a workpiece, the powered assembly including (i) an electric motor, (ii) holding provisions to hold a workpiece, and (iii) a drive assembly for transferring rotary power from the motor to the holding provisions;
an oil sump assembly for retaining cutting oil and including a main sump compartment which retains at least a portion of the cutting oil when the machine is in the operational position, and at least one transport sump compartment which retains substantially all of the cutting oil when the machine is in the transport position;
a handle assembly secured to the front portion of the frame, wherein the handle assembly includes provisions for extending the handle outward from the front portion of the frame and the handle can be selectively extended to a desired position and includes a latching assembly to retain the handle in the desired position.

* * * * *